US010545684B2

(12) United States Patent
Koseki et al.

(10) Patent No.: US 10,545,684 B2
(45) Date of Patent: Jan. 28, 2020

(54) STORAGE DEVICE

(71) Applicant: Hitachi, Ltd., Tokyo (JP)

(72) Inventors: Hideyuki Koseki, Tokyo (JP); Masahiro Arai, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/546,041

(22) PCT Filed: May 13, 2015

(86) PCT No.: PCT/JP2015/063788
§ 371 (c)(1),
(2) Date: Jul. 25, 2017

(87) PCT Pub. No.: WO2016/181528
PCT Pub. Date: Nov. 17, 2016

(65) Prior Publication Data
US 2018/0018113 A1      Jan. 18, 2018

(51) Int. Cl.
*G06F 12/02*       (2006.01)
*G06F 3/06*        (2006.01)

(52) U.S. Cl.
CPC .......... *G06F 3/0619* (2013.01); *G06F 3/0665* (2013.01); *G06F 3/0689* (2013.01); *G06F 12/02* (2013.01)

(58) Field of Classification Search
CPC ...................................................... G06F 12/16
USPC ......................................................... 711/114
See application file for complete search history.

(56) References Cited

U.S. PATENT DOCUMENTS

| | | | |
|---|---|---|---|
| 2010/0017557 A1* | 1/2010 | Nakanishi | G06F 12/0246 711/103 |
| 2014/0189204 A1* | 7/2014 | Sugimoto | G06F 3/061 711/103 |
| 2015/0100720 A1* | 4/2015 | Flynn | G06F 3/0616 711/103 |
| 2016/0004615 A1 | 1/2016 | Uehara et al. | |
| 2016/0019159 A1* | 1/2016 | Ueda | G06F 3/06 711/202 |

(Continued)

FOREIGN PATENT DOCUMENTS

WO      2014/196000 A1      12/2014

OTHER PUBLICATIONS

International Search Report of PCT/JP2015/063788 dated Aug. 11, 2015.

*Primary Examiner* — Gautam Saim
(74) *Attorney, Agent, or Firm* — Mattingly & Malur, PC

(57) ABSTRACT

A storage device relating to one aspect of the present invention has a storage controller and multiple memory devices. The memory devices manage capacity equivalent to the size of a memory space provided to the storage controller among regions of a non-volatile storage medium as logical capacity and manage the remaining regions as reserve capacity. When a device controller determines that a portion of the memory regions in the non-volatile storage medium is in an unusable state, the device controller notifies the storage controller of the size of the memory regions in the unusable state. On the basis of a policy set by the memory device, the storage controller determines the reduction amount of the logical capacity and the reserve capacity and notifies the memory device of the determined reduction amount of the logical capacity.

10 Claims, 21 Drawing Sheets

(56) References Cited

U.S. PATENT DOCUMENTS

2016/0162205 A1* 6/2016 Grimsrud .............. G06F 3/0616
711/103

* cited by examiner

Fig. 6

Virtual volume management table 500

| Virtual volume # 501 | Pool # 502 | Virtual volume LBA range 503 | Virtual chunk number 504 | RAID group number 505 | Chunk number 506 |
|---|---|---|---|---|---|
| 0 | 1 | 0x0000~0x04FF | 1 | 1 | 1 |
|   |   | 0x0500~0x09FF | 2 | 1 | 2 |
|   |   | 0x0A00~0x0EFF | 3 | 2 | 2 |
|   |   | 0x0F00~0x0FFF | 4 | NULL | NULL |
| 1 |   | 0x0000~0x04FF | 1 | 2 | 1 |
|   |   | 0x0500~0x09FF | 2 | 2 | 3 |
| ... |   |   |   |   |   |
| N |   |   |   |   |   |

Pool management table 550

| Pool # 551 | RG# 552 | Chunk # 553 | RAID Group LBA 554 | Status 555 | Remaining capacity of pool 556 |
|---|---|---|---|---|---|
| 1 | 1 | 1 | 0x0000~0x00FF | Allocated | 1000GB |
| | | 2 | 0x0100~0x0100 | Allocated | |
| | | 3 | 0x0200~0x02FF | Unallocated | |
| | | ... | ... | ... | |
| | | n | | Non-allocatable | |
| | 2 | 1 | 0x0000~0x00FF | Allocated | |
| | | 2 | 0x0100~0x0100 | Allocated | |
| | | ... | ... | ... | |
| ... | ... | ... | ... | ... | ... |
| NULL | K | 1 | 0x0000~0x00FF | Unallocated | ... |

Fig. 8

RAID Group Management Table 650

| RG# 651 | Drive number 652 | RAID Group LBA 653 | RAID level 654 | Drive logical capacity 655 | Drive reserve capacity 656 | Drive failure amount 657 | RAID Group remaining capacity 658 | Operation mode 660 |
|---|---|---|---|---|---|---|---|---|
| 1 | SSD#0 | 0x0000,... | RAID5 | 1PB | 10TB | 0 | 600GB | Performance |
|   | SSD#1 | 0x0010,... |  | 1PB | 10TB | 0 |  |  |
|   | SSD#2 | 0x0020,... |  | 1PB | 10TB | 0 |  |  |
|   | SSD#3 | 0x0040,... |  | 1PB | 10TB | 0 |  |  |
| 2 | SSD#4 | 0x0000,... | RAID6 | 6PB | 1PB | 100GB |  | Capacity |
|   | SSD#5 | 0x0010,... |  | 7PB | 1.3PB | 100GB |  |  |
|   | SSD#6 | 0x0020,... |  | 10PB | 1PB | 0 |  |  |
|   | SSD#7 | 0x0040,... |  | 12PB | 2PB | 0 |  |  |
| ... | ... | ... |  | ... |  |  | ... |  |
| N |  |  |  |  |  |  |  |  |

Fig. 9

Configuration information management table 1300

| 1301 Total physical capacity | 1302 Logical capacity | 1303 Reserve capacity | 1304 Blocked capacity | 1305 WAF |
|---|---|---|---|---|
| 3.0TB | 1.6TB | 1.3TB | 0.1TB | 2.5 |

Fig.10 1100

Logical-Physical Conversion Table

| SSD LBA 1101 | Logical page # 1102 | Status 1103 | Block # 1104 | Physical page # 1105 |
|---|---|---|---|---|
| 0x0000 | 0 | Allocated | 2 | 0 |
| 0x0500 | 1 | Allocated | 0 | 0 |
| 0x0A00 | 2 | Unallocated | NULL | NULL |
| 0x0E00 | 3 | Allocated | 0 | 1 |
| ... | ... | ... | ... | ... |
| 0x9B00 | K-1 | Unallocated | NULL | NULL |
| 0xA000 | K | Unallocated | NULL | NULL |
| ... | ... | ... | ... | ... |

Fig. 11

| Block Management Table 1150 | | | | |
|---|---|---|---|---|
| Block # 1151 | Physical page # 1152 | Status 1153 | Error bit count 1154 | Erase count 1155 |
| 0 | 0 | Not used | 40 | 3000 |
|   | 1 | Allocated | 1000 |   |
|   | 2 | Unallocated | 50 |   |
|   | ... | ... |   |   |
| 1 | 0 | Blockade (reservation) | 4000 | 4532 |
|   | ... | Blockade (reservation) | 2000 |   |
| 2 | 0 | Blockade | N/A | 2123 |
|   | 1 | Blockade | N/A |   |
|   | ... | ... | ... |   |
| ... |   |   |   | ... |

STORAGE DEVICE

TECHNICAL FIELD

The present invention relates to storage devices.

BACKGROUND ART

Storage devices are equipped with a large number of memory devices for storing data, and a storage controller for controlling the memory devices, and the object thereof is to provide a large capacity of data storage space to a computer.

Heretofore, HDDs (Hard Disk Drives) are installed as memory devices, but recently, memory devices (such as SSDs: Solid State Drives) having nonvolatile semiconductor memories (such as FMs: Flash Memories) are attracting attention as new storage media that can be used in replacement of HDDs.

Generally, many SSDs are equipped with a plurality of NAND type FM chips, and the FM chips perform reading and writing of data in units called pages. Since the FM cannot directly overwrite the data stored in a page, data must be erased once to store new data. Erasing of data is executed to a group of pages called a block. Further, a group of blocks called a die is constructed within the FM. There is an upper limit in the number of times that a block can be erased. In other words, the FM has a life, and the SSD including the large number of FMs also has a life. For example, if the FM reaches its end of life, reading and writing of data may not be performed correctly. If data cannot be read correctly, the SSD will be in a state where stored data is lost.

Further, the quality of the FMs may be dispersed in units of dies and chips. If the quality of the die is not good, failure may occur by the die reaching its life even before the number of erase counts reaches a predetermined target count, and the die becomes unusable. For example, SSD provides a storage capacity (hereinafter called logical capacity) to the user. However, if failure occurs to a part of the FM chips and the capacity cannot be maintained, the SSD will be blocked even if there are other FM chips having high quality and are in a usable state.

As described, if the SSD becomes unusable earlier than the predetermined period of time, the frequency of replacement increases, requiring costs for additional purchase or maintenance of SSDs, which may lead to the increase of TCO. Further, if the whole SSD is blocked when failure occurs to only a part of the FM chips, the large number of remaining usable FM chips will be wasted.

Patent Literature 1 discloses a technique that enables to block only the area where failure has occurred, instead of blocking the whole SSD in which FM chip failure has occurred, to allow continuous use of the SSD.

CITATION LIST

Patent Literature

[PTL 1] WO 2014/196000

SUMMARY OF INVENTION

Technical Problem

According to the technique disclosed in Patent Literature 1, the blockade of the whole SSD can be prevented, but the capacity (logical capacity) that an external device such as the storage controller can use is reduced by the blockade. Therefore, the technique leads to the deterioration of bit cost of the system (the bit cost is increased).

In addition to the logical capacity, the SSD includes a storage capacity (called reserve capacity) required to execute internal processing such as reclamation. If a relatively large amount of reserve capacity is provided, it may be possible to prevent reduction of logical capacity when failure occurs to the FM, by reducing the reserve capacity instead of reducing the logical capacity.

If there is a large amount of reserve capacity, reclamation processing can be performed efficiently, so there is a positive influence on the performance of the SSD. On the other hand, if there is only a small reserve capacity, there is a negative influence on performance, so that it is not preferable to reduce the reserve capacity if performance is prioritized in operation.

Solution to Problem

According to one aspect of the present invention, the storage device includes a storage controller and a plurality of memory devices. The memory device manages an area of the nonvolatile storage media having a capacity equal to the size of the storage space provided to the storage controller as a logical capacity, and manages the remaining area as the reserve capacity. If the device controller determines that a part of the storage area of the nonvolatile storage media is in an unusable state, it notifies the size of the storage area in the unusable state to the storage controller. On the basis of a policy set for the memory device, the storage controller determines a reduction amount of logical capacity and reserve capacity, and notifies the determined reduction amount of logical capacity to the memory device.

Advantageous Effects of Invention

According to the present invention, reduction processing based on an operation policy of the user can be performed during reduction of capacity.

BRIEF DESCRIPTION OF DRAWINGS

FIG. 6 is a view illustrating a configuration of a virtual volume management table.

FIG. 7 is a view illustrating a configuration of a pool management table.

FIG. 8 is a view illustrating a RAID group management table.

FIG. 9 is a view illustrating a configuration of a configuration information management table.

FIG. 10 is a view illustrating a configuration of a logical-physical conversion table.

FIG. 11 is a view illustrating a configuration of a block management table.

DESCRIPTION OF EMBODIMENTS

Now, a few embodiments will be described. In the following description, it is assumed that a memory device is an SSD. A nonvolatile semiconductor storage medium included in the SSD is assumed to be a flash memory (FM). The flash memory should be a flash memory of the type where read/write is performed in page units, typically a NAND type flash memory. However, flash memories other than the NAND type can also be used. Further, nonvolatile semiconductor storage media other than the flash memory, such as a phase-change memory, can also be adopted.

First Embodiment

Figure 1:
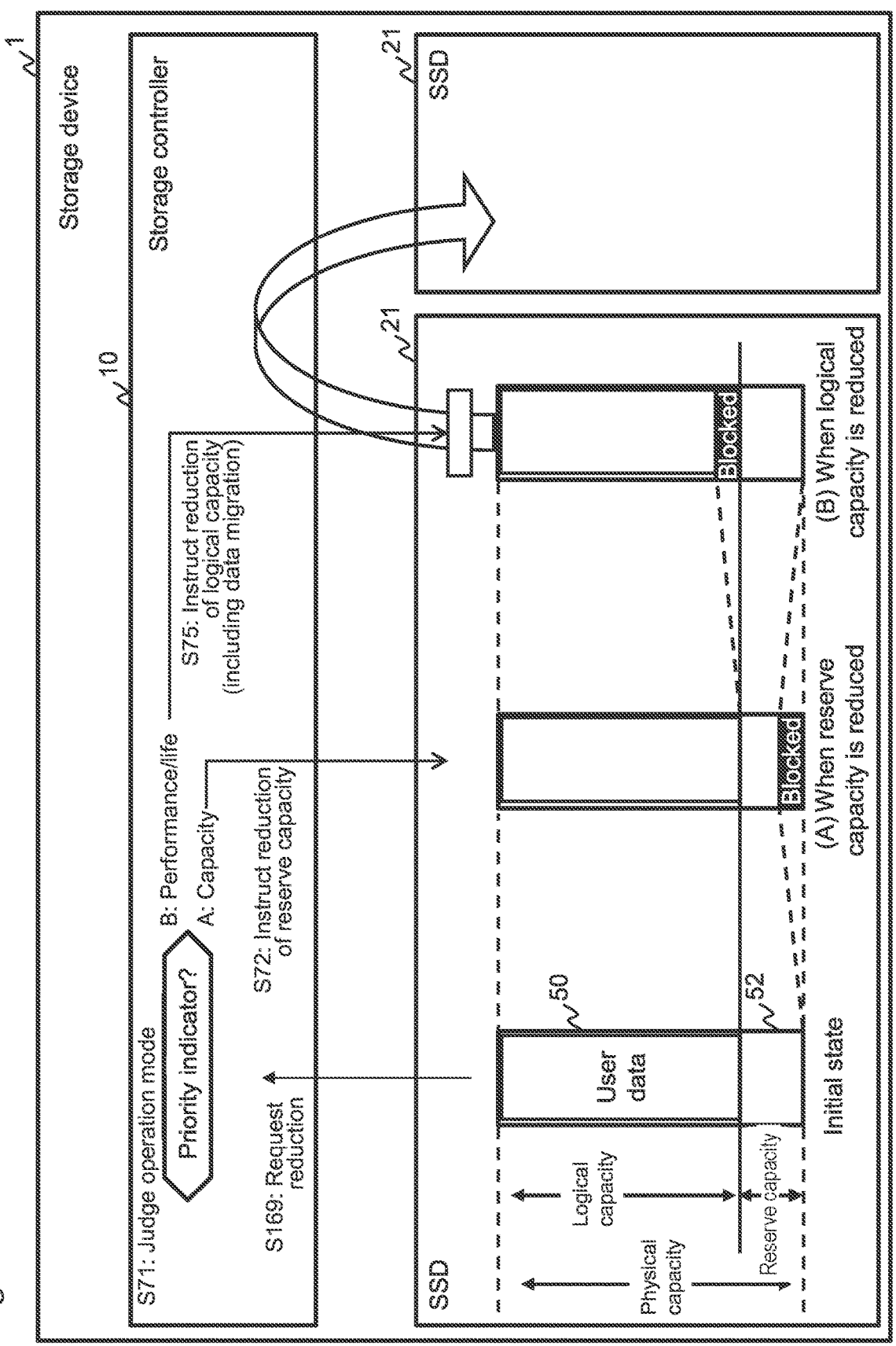
FIG. 1 is a view illustrating a general outline of the present invention.

At first, an outline of a first embodiment will be described with reference to FIG. 1. A storage device 1 according to the first embodiment includes SSDs 21 as an example of a memory device (typically a nonvolatile memory device), and a storage controller 10 for controlling the memory device.

The SSD 21 includes a plurality of flash memory chips (FM chips) as storage media. Further, the SSD 21 provides a storage space having a predetermined size (logical address space; also abbreviated as LBA space). In the following description, the size of the LBA space is called "logical capacity". Meanwhile, a total size of the storage area in the FM chips of the SSD 21 is called "physical capacity". The physical capacity is greater than the logical capacity. In the following description, a storage area included in the FM chips of the SSD 21 is called PBA space.

Among the storage areas in the PBA space, an area having a size equal to the logical capacity is allocated to the LBA space, and used for storing data written from the storage controller 10. This area is called a user data storage area 50. Further, the remaining storage area in the PBA space is a kind of reserve area 52 provided for the SSD 21 to execute a reclamation processing and the like. The size of this area is called reserve capacity.

The roles of the respective storage areas in the PBA space are not fixed. A storage area used for storing user data at a certain point of time can be used as the reserve area 52 at other times.

In the storage device 1 according to the first embodiment, when failure occurs to part of the storage areas (such as a block and a page) in the SSD 21, and the area becomes unusable, the storage area is set to a blocked state, and the use thereof is stopped. At this time, it is necessary to reduce either the logical capacity or the reserve capacity corresponding to the size of the storage area being blocked. This is because the storage area being blocked is an unusable area due to failure and the like, so it cannot be allocated to the LBA space or cannot be used for executing reclamation processing and other processes. In the following description, shrinking capacity (logical capacity or reserve capacity) along with the blockade of the storage area in the SSD 21 is called "reduction".

If a logical capacity is reduced, a storage capacity that the SSD 21 provides to the storage controller 10 is reduced, and the amount of data that the storage device 1 can store is reduced. Meanwhile, if a reserve capacity is reduced, an area for executing reclamation processing and the like is reduced. As the reserve capacity increases, the SSD 21 can execute the reclamation processing more efficiently. In contrast, the reduction of the reserve capacity deteriorates the efficiency of the reclamation processing, and leads to deterioration of performance of the SSD 21.

The storage device 1 according to the first embodiment, in a state where blockade of the storage area occurs, performs reduction of either the logical capacity or the reserve capacity based on a predetermined policy. If a policy to maintain capacity is set, the storage controller 10 instructs the SSD 21 to maintain the logical capacity and reduce the reserve capacity (FIG. 1(A): when reserve capacity is reduced). Meanwhile, if a policy to put weight on performance is set, the storage controller 10 instructs the SSD 21 to maintain the reserve capacity and reduce the logical capacity FIG. 1(B): when logical capacity is reduced). Thereby, a reduction processing matching the purpose of use by the user can be performed.

Further, if the logical capacity is reduced, a part of the storage area in the LBA space that has been provided to the storage controller 10 is reduced, and becomes unusable. Therefore, if data from the storage controller 10 is stored in the storage area in the LBA space to be reduced, the storage controller 10 migrates the data to a different SSD 21, and thereafter, instructs the SSD 21 to reduce the logical capacity.

Figure 2:
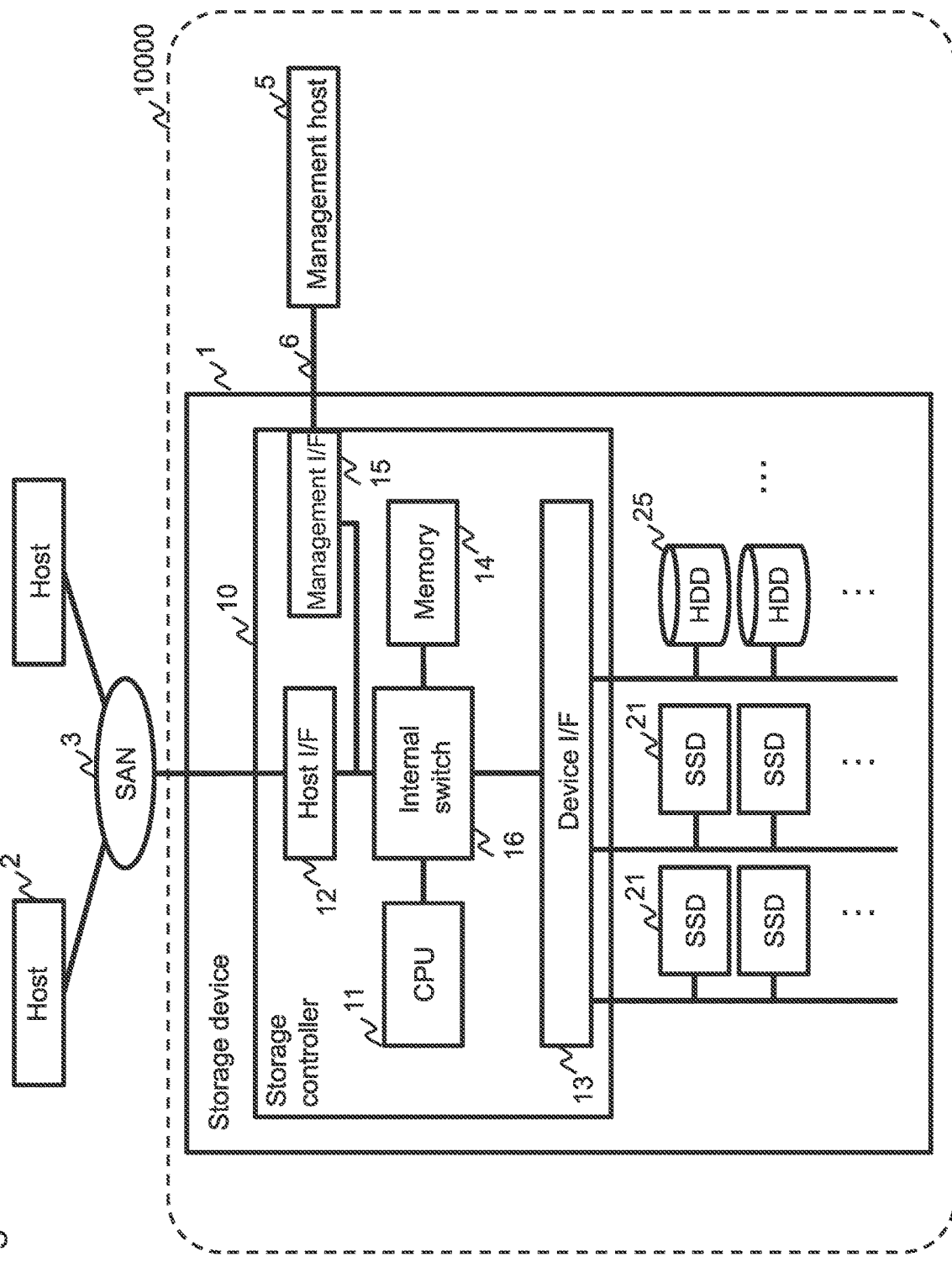
FIG. 2 is a view illustrating a configuration example of a storage system 10000 including a storage device 1 according to a first embodiment of the present invention.

Hereafter, the details of configuration and operation of the storage device 1 according to the first embodiment will be described. FIG. 2 is a view illustrating an example of the configuration of a storage system 10000 including the storage device 1 according to the first embodiment.

The storage device 1 includes the storage controller 10, and the plurality of SSDs 21 connected to the storage controller 10.

The SSD 21 is a memory device for storing write data from an external device such as a host (hot computer) 2, and adopts a nonvolatile semiconductor memory like a flash memory as a storage medium. An internal configuration of the SSD 21 will be described later. Each SSD 21 is connected to the storage controller 10 via a transmission line compliant with, for example, SAS (Serial Attached SCSI) standards (SAS link) or PCI (Peripheral Component Interconnect) standards (PCI link).

Further, as illustrated in FIG. 2, other than the SSD 21, an HDD (Hard Disk Drive) 25 can also be installed to the storage device 1 of the present embodiment. The HDD 25 is a memory device having a magnetic disk as a storage medium. Similar to the SSD 21, the HDD 25 is also connected to the storage controller 10. Similar to the SSD 21, the HDD 25 is connected to the storage controller 10 via an SAS link and the like. But in the following description, a configuration is mainly described in which only the SSDs 21 are connected as the memory device to the storage device 1 of the present embodiment.

One or more hosts 2 are connected to the storage controller 10. Further, a management host 5 is connected to the storage controller 10. The storage controller 10 and the host 2 are connected via a SAN (Storage Area Network) 3 formed using Fibre Channel, as an example. The storage controller 10 and the management host 5 are connected via a LAN (Local Area Network) 6 formed using Ethernet, as an example.

The storage controller 10 includes, at least, a processor (CPU) 11, a host interface (denoted as "host I/F" in the drawing) 12, a device interface (denoted as "device I/F" in the drawing) 13, a memory 14, and a management I/F 15. The processor 11, the host I/F 12, the device I/F 13, the memory 14 and the management I/F 15 are mutually connected via an internal switch (internal SW) 16. Only one each of these components are illustrated in FIG. 2, but in order to ensure high performance and high availability, a plurality of each component can be installed in the storage controller 10. The respective components can be mutually connected via a common bus instead of the internal SW 16.

The device I/F 13 includes at least an interface controller and a transfer circuit. The interface controller is a component for converting a protocol (such as the SAS) used in the SSD 21 to a communication protocol (such as the PCI-Express) used inside the storage controller 10. The transfer circuit is used for transferring (reading or writing) data from the storage controller 10 to the SSD 21.

Similar to the device I/F 13, the host I/F 12 at least includes an interface controller and a transfer circuit. The interface controller of the host I/F 12 is used for converting the communication protocol (such as Fibre Channel) used in a data transfer path between the host 2 and the storage controller 10 to a communication protocol used inside the storage controller 10.

The processor 11 performs various control of the storage device 1. The memory 14 is used for storing programs executed by the processor 11 and various management information of the storage device 1 used by the processor 11. Further, the memory 14 is also used for temporarily storing I/O target data with respect to the SSD 21. Hereafter, the storage area in the memory 14 used for temporarily storing the I/O target data with respect to the SSD 21 is called a "cache". The memory 14 is composed of a volatile storage medium such as a DRAM or an SRAM, but as another embodiment, the memory 14 can be composed of a nonvolatile memory.

The management host 5 is a computer for performing management operation of the storage device 1. The management host 5 comprises an input/output device (not shown) such as a keyboard and a display, and the user (administrator) can set or enter instruction to the storage device 1 through the input/output device. Further, the management host 5 can display information such as the status of the storage device 1 on an output device such as a display.

Figure 3:
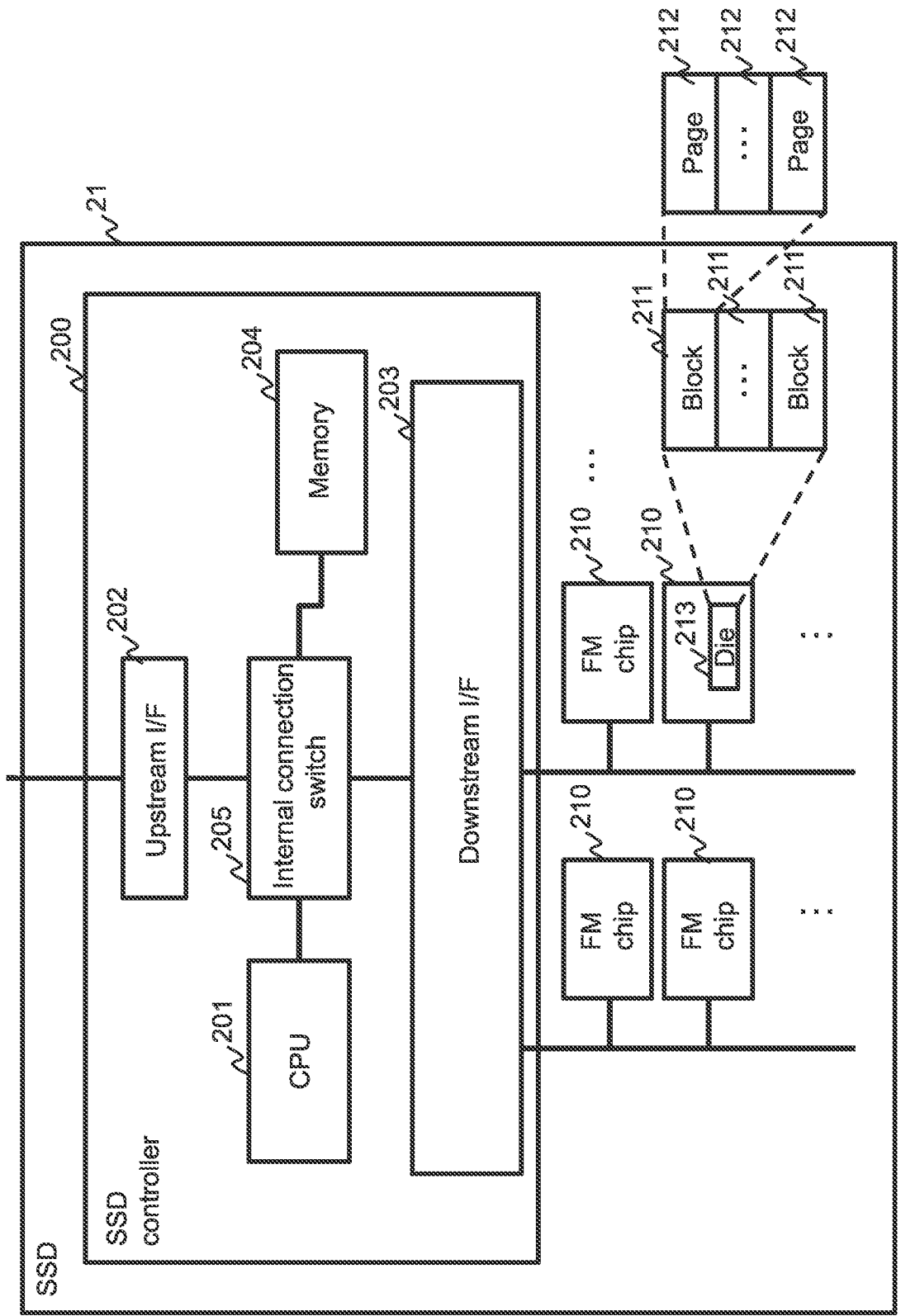
FIG. 3 is a view illustrating a configuration example of an SSD.

FIG. 3 is a view illustrating a configuration example of the SSD 21.

The SSD 21 is composed of an SSD controller 200 and a plurality of FM chips 210. The SSD controller 200 includes a processor (CPU) 201, an upstream I/F 202, a downstream I/F 203, and a memory 204, which are mutually connected via an internal connection switch (internal connection SW) 205.

The upstream I/F 202 is an interface controller for performing communication between the SSD 21 and the storage controller 10. The upstream I/F is connected to a device IF 13 of the storage controller 10 via a transmission line (such as a SAS link or a PCI link). The downstream I/F 203 is an interface controller for performing communication between the SSD controller 200 and the FM chips 210.

Further, the downstream I/F 203 has a function to generate ECC (Error Correcting Code), detect and correct error using the ECC. BCH code or LDPC (Low Density Parity Check) code can be used as an example of the ECC. When data is transmitted (written) from the SSD controller 200 to the FM chip 210, the downstream I/F 203 generates ECC. The downstream I/F 203 adds the generated ECC to the data, and the data having ECC added thereto is written to the FM chip 210. When the SSD controller 200 reads data from the FM chip 210, ECC-added data is read from the FM chip 210, and the ECC-added data arrives at the downstream I/F 203. The downstream I/F 203 uses the ECC to perform a data error check (generate ECC from data, and check whether the generated ECC is the same as the ECC added to the data), and if data error is detected, data correction is performed using the ECC. It also has a function in which, if data error occurs, the occurred number of data error is notified to the CPU 201.

The CPU 201 performs processing related to various commands arriving from the storage controller 10. The memory 204 stores programs executed by the processor 201, and various management information. Further, a part of the area in the memory 204 is used as a buffer for temporarily storing write data transmitted with a write command from the storage controller 10, or data read from the FM chips 210. A volatile memory such as a DRAM is used as the memory 204. However, a nonvolatile memory can also be used as the memory 204.

The FM chips 210 are nonvolatile semiconductor memory chips such as NAND-type flash memories. As well known, data is read and written in units of pages 212 in the flash memory, and data erase is performed in units of blocks 211, which are a set of pages 212. A page to which data has been written once cannot be overwritten, and in order to rewrite data to a page to which data has been written once, the whole block including the page must be erased. A plurality of dies 213 as a set of blocks 211 exist within the FM chip 210, and a plurality of pages 212 exist within the block 211. The size of the respective pages 212 are the same, such as 8 KB.

A concept called "logical page" is also used in the description of the present embodiment, which will be described in detail later. In the present embodiment, a logical page is used as a term referring to an area on the storage space that the SSD 21 provides to the storage controller 10. In order to distinguish pages 212 from logical pages, the pages 212 may also be called "physical pages". In the following description, the term simply written as "page" means a physical page.

The SSD 21 according to the present embodiment should merely be a memory device having a plurality of flash memories and a controller for controlling the memories, and the form factor is not restricted to conventional HDDs or SSDs. A nonvolatile semiconductor memory such as NOR or NAND type can be used as the flash memory. Further, instead of the flash memory, various types of semiconductor memories, such as an MRAM (Magnetoresistive Random Access Memory) serving as a magnetoresistance memory, a ReRAM (Resistance Random Access Memory) serving as a resistance-change memory, or a FeRAM (Ferroelectric Random Access Memory) serving as a ferroelectric memory, can be used.

Next, the relationship between the virtual volume, the RAID group and the pool will be described with reference to FIGS. 4 and 5.

The storage device 1 configures a RAID using a plurality of SSDs 21. A set of a plurality of SSDs 21 configuring the RAID is called a RAID group. In a state where failure has occurred to one (or two) SSDs 21 in the RAID group and data could not be accessed, the storage device 1 can recover the data stored in the SSD 21 in which failure has occurred, by using data stored in the remaining SSDs 21.

Figure 4:
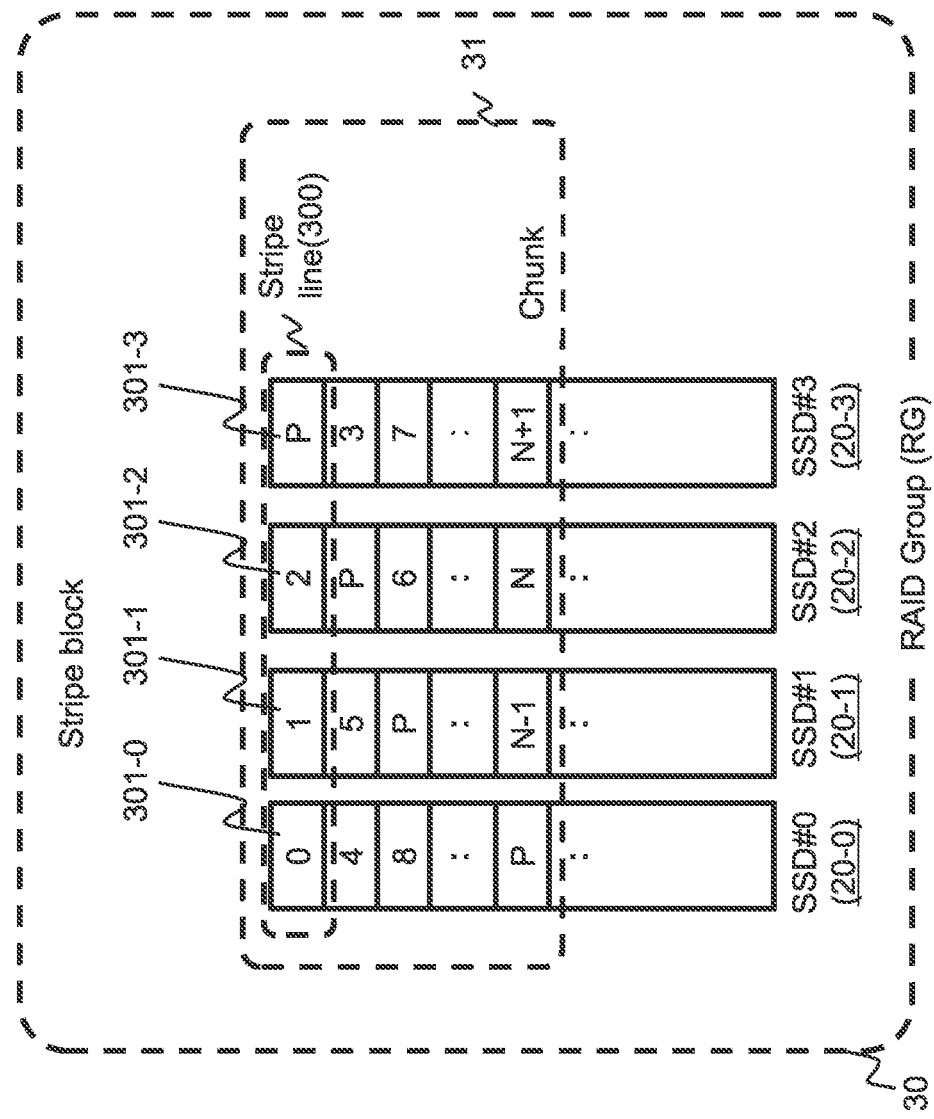
FIG. 4 is an explanatory view of a RAID group.

In FIG. 4, SSD #0 (20-0) through SSD #3 (20-3) respectively represent the logical address space (LBA space) that the SSDs 21 provide to the storage controller 10. Upper ends of SSD #0 (20-0) through SSD #3 (20-3) represent an initial address (LBA=0) of the logical address space, and lower ends represent ends of the logical address space. In the example of FIG. 4, the storage controller 10 operates SSD #0 (20-0) through SSD #3 (20-3) as one RAID group 30.

Further, FIG. 4 illustrates an example in which a RAID level (representing a data redundancy method in a RAID technique, which generally includes RAID levels from RAID 1 to RAID 6) of the RAID group 30 is RAID 5. In FIG. 4, boxes denoted by "0", "1" and "P" in the RAID group 30 represent stripe blocks, and the size of each stripe block is 64 KB, 256 KB or 512 KB, for example. Further, a number such as "1" assigned to each stripe block is referred to as "stripe block number".

Among the stripe blocks in FIG. 4, the stripe block denoted by "P" represents a stripe block in which redundant data (parity) is stored, and this block is called a "parity stripe". Meanwhile, the stripe blocks denoted by numerals (0, 1 and so on) are stripe blocks storing data (data that is not redundant data) written from external devices such as the host 2. These stripe blocks are called "data stripes".

Redundant data stored in the parity stripe is generated using the data in the data stripes. In the followings, a set composed of a parity stripe and data stripes (for example, element 300 of FIG. 4) used for generating redundant data stored in the relevant parity stripe is called a "stripe line". In the case of the storage device 1 according to the present embodiment, as illustrated in stripe line 300 of FIG. 4, the stripe lines are configured based on a rule that each stripe block belonging to a single stripe line exists at the same location (address) in SSD #0 (20-0) through SSD #3 (20-3).

The storage controller 10 manages the plurality of stripe lines continuously arranged in the RAID group in management units called "chunks". As illustrated in FIG. 4, one chunk 31 includes a plurality of stripe lines. The sizes of the respective chunks are the same. However, a configuration can be adopted where one chunk 31 includes only one stripe line.

An identification number unique within the RAID group is assigned to each chunk, and this identification number is called a chunk number. The chunk number of the chunk including a first stripe line in the RAID group (stripe line composed of stripe blocks at a head of the SSD #0 (20-0) through SSD #3 (20-3)) is set to 1, and continuous integral values are assigned to the respective chunks located thereafter.

Since the respective chunks are arranged regularly in the RAID group as described above, the address (range) on the LBA space of the SSD 21 belonging to a chunk can be computed by a relatively simple calculation from the chunk number. Conversely, from the address on the LBA space of the SSD 21, the chunk number of the chunk to which the address belongs can also be calculated.

Further, the storage controller 10 provides one or more virtual storage spaces to the host 2 that differs from the storage area of the RAID group. The virtual storage space is called a "virtual volume". The storage space of the virtual volume is divided into areas having a predetermined size and managed. The area having the predetermined size is called a "virtual chunk". A virtual chunk is an allocation unit of the storage area of the virtual volume.

One chunk is mapped to one virtual chunk, and when data write occurs from the host 2 to the virtual chunk, data is stored in the mapped chunk. However, when a chunk is mapped to the virtual chunk, only the data stripe within the chunk is mapped. Therefore, the size of the virtual chunk is equal to the total size of all data stripes included in the chunk. The storage controller 10 records the mapping of the virtual chunk and chunk to a virtual volume management table 500 described later, in order to manage the storage area (chunk) being allocated to the virtual chunk.

Immediately after the virtual volume has been defined, no chunk is mapped to the respective virtual chunks in the virtual volume. When a write request is received from the host 2 to the area in the virtual chunk for the first time, the storage controller 10 decides the storage area (chunk) on the logical address space of the SSDs 21 where data written to the relevant area is to be stored. The chunk determined at this time is chosen from chunks that are not yet allocated to any virtual chunk (unused chunk).

Figure 5:
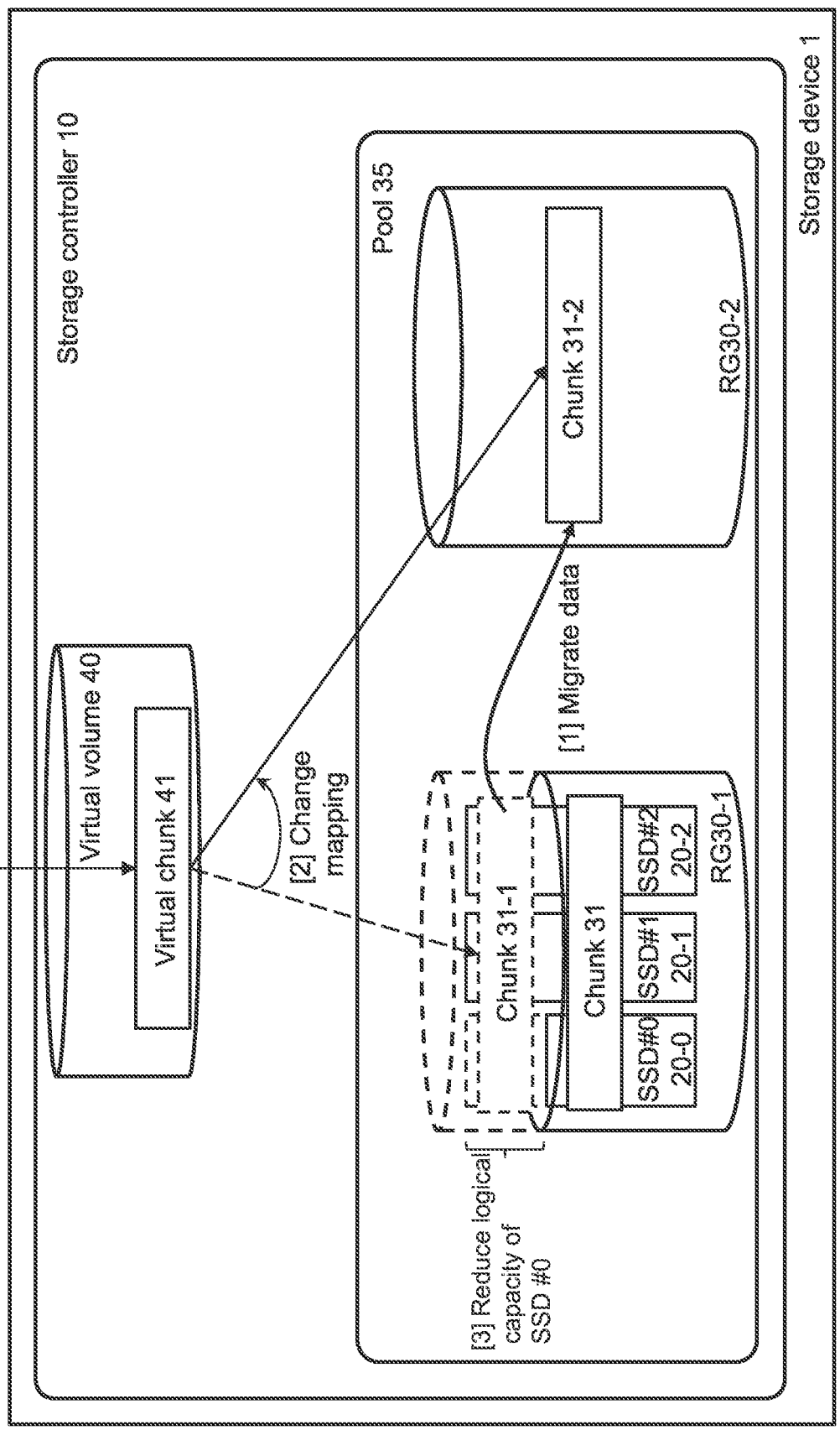
FIG. 5 is a view illustrating a relationship of virtual volume, RAID group and pool.

FIG. 5 is a view illustrating the relationship among virtual volume, RAID group and pool.

In the storage device 1 according to the present embodiment, the one or more RAID groups having storage areas (chunks) that can be allocated (mapped) to the virtual chunk are registered to the management unit called pool. The storage device 1 can manage one or more pools. If the storage device 1 manages a plurality of pools, the respective RAID groups having storage areas allocatable to the virtual chunk are registered to one of the plurality of pools. Hereafter, the RAID groups (and the chunks in the RAID group) managed by a certain pool (temporarily called pool X) are called "RAID groups (and chunks) belonging to pool X". The respective virtual volumes are registered to one of the plurality of pools. When the storage device 1 allocates a chunk to a virtual chunk in a virtual volume, it selects an unused chunk from the pool to which the virtual volume is registered in advance, and allocates the selected chunk to the virtual chunk.

As mentioned earlier, the logical capacity of the SSD 21 may be reduced. If the logical capacity is reduced, the storage space provided by the SSD 21 will become smaller. FIG. 5 illustrates an example in which the LBA space (20-0) of the SSD #0 is reduced. FIG. 5 illustrates an example of a case in which a chunk (chunk 31-1) mapped to the virtual chunk 41 existed in the area of the LBA space of the SSD #0 being reduced. In this case, the storage area of the SSD 21 constituting the chunk 31-1 will no longer exist (will be unusable).

Therefore, when the logical capacity of the SSD 21 is to be reduced, the storage device 1 must migrate the data existing in the area being reduced to a different SSD 21. However, since the storage device 1 according to the present embodiment manages data chunk-by-chunk basis, it performs data migration in units of chunks. At first, the storage controller 10 migrates the data stored in chunk 31-1 to an unused chunk existing in a different RAID group (RG 30-2) within the pool 35 (FIG. 5), and changes the chunk mapped to a virtual chunk 41 from chunk 31-1 to chunk 31-2 (FIG. 5). The reduction of logical capacity of the SSD 21 is performed thereafter (FIG. 5). By performing such process, data is prevented from being lost during reduction of the logical capacity.

Next, we will describe major management information used in the storage controller 10.

The memory 14 of the storage controller 10 includes at least a virtual volume management table 500, a pool management table 550, and a RAID group management table 650. The contents of these management tables will be described below.

FIG. 6 is a view illustrating a configuration of a virtual volume management table.

The virtual volume management table 500 is a table managing a mapping relationship of virtual chunks in the respective virtual volumes defined in the storage device 1 and the chunks. The virtual volume management table 500 includes columns of a virtual volume #501, a pool #502, a virtual volume LBA range 503, a virtual chunk number 504, a RAID group number 505, and a chunk number 506. Each row (record) of the virtual volume management table 500 shows that a chunk specified by the RAID group number 505 and the chunk number 506 is mapped to the virtual chunk specified by the virtual volume #501 and the virtual chunk number 504. Hereafter, the rows in the tables managing various information, not restricted to the virtual volume management table 500, are called "records".

In the initial state, a chunk is not mapped to a virtual chunk. At a point of time when a write request to a virtual chunk is received from the host 2, a chunk is mapped to the virtual chunk. If a chunk is not mapped to the virtual chunk specified by the virtual chunk number 504, an invalid value (NULL) is stored in the RAID group number 505 and the chunk number 506 of the relevant record.

The pool #502 stores an identification number of a pool to which chunks allocatable to the virtual volume belong. That is, chunks allocatable to the virtual chunks in the virtual volume specified by the virtual volume #501 are basically restricted to the chunks (or RAID group(s)) belonging to the pool #502. Further, the virtual volume LBA range 503 is information indicating which area in the virtual volume the virtual chunk specified by the virtual chunk number 504 corresponds to. As an example, in row (record) 500-1 of FIG. 6, since the virtual volume LBA range 503 is "0x0500 to 0x09FF" and the virtual chunk number 504 is "2", it indicates that virtual chunk #2 in virtual volume #0 corresponds to the area whose LBA is between 0x0500 and 0x09FF in the virtual volume #0.

FIG. 7 is a view illustrating a configuration of a pool management table.

A pool is managed by the pool management table 550. The pool management table 550 includes columns of a pool #551, an RG #552, a chunk #553, a RAID group LBA 554, a status 555, and a remaining capacity of pool 556. In the pool management table 550, each record is for storing information related to a chunk. The RG #552 of each record shows the RAID group number of the RAID group to which the chunk belongs, and the pool #551 represents the pool number of the pool to which the chunk belongs. Further, the pool #551 can be described as representing the pool number to which the RAID group specified by the RG #552 belongs.

The RAID group LBA 554 of each record represents information showing the area in the RAID group where the chunk is located. The status 555 is information showing whether the chunk is allocated (mapped) to a virtual chunk. If "allocated" is stored in the status 555, it means that the chunk is allocated to a virtual chunk. In contrast, if "unallocated" is stored in the status 555, it means that the chunk is not allocated to the virtual chunk. Further, if "non-allocatable" is stored in the status 555, it means that the chunk cannot be allocated to the virtual chunk. Specifically, it is a chunk that cannot store data (or the storage controller 10 has stopped storing data) accompanying the reduction of capacity of the SSD. The remaining capacity of pool 556 is a total size of the chunk(s) whose status 555 is/are "unallocated". The remaining capacity of pool 556 is also called an unused capacity of pool.

FIG. 8 is a view illustrating a configuration of a RAID group management table.

The RAID group is managed by the RAID group management table 650. The RAID group management table 650 includes columns of an RG #651, a drive number 652, a RAID group LBA 653, a RAID level 654, a drive logical capacity 655, a drive reserve capacity 656, a drive failure amount 657, a RAID group remaining capacity 658, and an operation mode 660. A RAID group number of the RAID group is stored in the RG #651, and an identifier of the SSD 21 belonging to the RAID group specified by the RG #651 is stored in the drive number 652. The RAID group LBA 653 is information indicating in which area of the RAID group the respective areas of the SSD 21 specified by the drive number 652 are located.

The RAID level 654 indicates a RAID configuration of the relevant RAID group. The drive logical capacity 655 stores a logical capacity of the storage device (SSD 21) specified by the drive number 652. The drive reserve capacity 656 stores a reserve capacity of the memory device (SSD 21) specified by the drive number 652. The drive failure amount 657 is an amount of storage area being blocked among the storage areas of the memory device (SSD 21) specified by the drive number 652. The drive logical capacity 655, the drive reserve capacity 656 and the drive failure amount 657 may vary in accordance with the capacity reduction.

The RAID group remaining capacity 658 is a total value of the unused portion of the RAID group, that is, a total value of the portion not mapped to the virtual chunk among the areas in the RAID group.

The operation mode 660 stores information for determining the operation when reducing capacity. If "performance" is stored in the operation mode 660, the storage controller 10 executes a capacity reduction processing prioritizing performance. If "capacity" is stored in the operation mode 660, the storage controller 10 operates to keep the capacity (logical capacity) during capacity reduction processing. The details will be described in the description of the capacity reduction processing.

Recording of information to the RAID group management table 650 is enabled by the user (administrator) of the storage device 1 instructing to create a RAID group through the management host 5. When creating a RAID group, the user can designate the identifier (drive number) of the SSDs 21 constituting the RAID group, the RAID level, and the operation mode. The storage controller 10 having received designation of these information stores the designated information in the RG #651, the drive number 652, the RAID level 654 and the operation mode 660 to create a RAID group. At this time, information other than the above in the RAID group management table 650 is automatically set by the storage controller 10.

Next, the main management information used in the SSD controller 200 will be described.

The memory 204 of the SSD 21 stores at least a logical-physical conversion table 1100, a block management table 1150, an FM error characteristic retention table 1200, a configuration information management table 1300, and an FM life characteristic retention table 1400.

FIG. 9 is a view illustrating a configuration of a configuration information management table.

The configuration information management table 1300 mainly stores information related to the capacity of the SSD 21. The configuration information management table 1300 includes columns of a total physical capacity 1301, a logical capacity 1302, a reserve capacity 1303, a blocked capacity 1304, and a WAF 1305.

The total physical capacity 1301 is a total capacity of the FM chip included in the SSD 21. The logical capacity 1302 is a logical capacity that the SSD 21 currently provides to the user and the storage controller 10. The reserve capacity 1303 is the size of the reserve capacity at the current time point of the SSD 21. The blocked capacity 1304 is a total size of the block of the FM chip which is in a blocked state at the current time point. The sum of the logical capacity 1302, the reserve capacity 1303 and the blocked capacity 1304 is equal to the total physical capacity 1301. The SSD 21 having the configuration information management table 1300 illustrated in FIG. 9 has a total physical capacity of 3.0 TB, and at the current time point, a capacity of 1.6 TB is provided as logical capacity to the user and the storage controller 10. The relevant SSD has a reserve capacity of 1.3 TB at the current time point, and it shows that a block of 0.1 TB is already in a blocked state.

The WAF 1305 is a ratio of a total amount of data written to the respective FM chips 210 in the SSD 21, and a total value of amount of write data received from the storage controller. In the SSD 21 according to the first embodiment, managing the WAF 1305 is not indispensable. The details of the WAF 1305 will be described in a second embodiment.

FIG. 10 is a view illustrating a logical-physical conversion table.

The logical-physical conversion table 1100 is a table for managing the mapping of the logical page and the physical page managed in the SSD 21. The SSD 21 divides the storage space that the SSD 21 provides to the storage controller 10 into predetermined sized areas, and manages them. These areas are called "logical pages". The SSD 21 maps one physical page to one logical page, for example.

The SSD 21 according to the present embodiment assigns a unique identification number within the SSD 21 to each of the blocks of all the FM chips 210 in the SSD 21 for management, and this identification number is called a block number (block #). A unique number within the block is assigned to each page in the block for management, and this number is called a physical page number (or physical page #). The physical page within the SSD 21 can be specified uniquely by specifying the block # and the physical page #.

Further, the SSD 21 according to the present embodiment assigns a unique identification number within the SSD to each logical page in the SSD 21 for management. This identification number is called a logical page number (logical page #). In the logical-physical conversion table 1100, the information of block # and physical page # of the physical page mapped to a certain logical page is stored for each logical page.

As illustrated in FIG. 10, the logical-physical conversion table 1100 includes columns of an SSD LBA 1101, a logical page #1102, a status 1103, a block #1104, and a physical page #1105. Information regarding the logical page specified by the logical page #1102 is stored in each record of the logical-physical conversion table 1100. The LBA (range) on the logical address space that the SSD 21 provides to the storage controller 10 corresponding to the logical page is stored in the SSD LBA 1101. If the SSD 21 receives an access request (read command or write command) from the storage controller 10, the SSD 21 uses the SSD LBA 1101 and the logical page #1102 to convert the LBA included in the access request to the logical page #. Information for specifying the physical page mapped to the logical page (that is, the block # and the physical page #) are respectively stored in the block #1104 and the physical page #1105.

Information indicating whether a physical page is mapped to a logical page is stored in the status 1103. In the initial state, the physical page is not mapped to the logical page of the SSD 21. At a time point when a write command is received from the storage controller 10, a physical page is mapped to the logical page being the write target according to the write command. If "allocate" is stored in the status 1103, it shows that the physical page is mapped to the logical page. In contrast, if "unallocated" is stored in the status 1103, it means that the physical page is not mapped to the logical page (at this time, NULL (invalid value) is stored in the block #1104 and the physical page #1105 corresponding to the logical page).

As well known, overwrite to a physical page to which data has been written once is not possible (that is, if overwrite of a physical page is to be performed, the whole block to which the physical page belongs must first be erased). Therefore, in the SSD 21, if an update (overwrite) request to a certain logical page is received from the storage controller 10, update data is stored in a physical page (called a new physical page) that differs from the physical page to which data before update is written (called an old physical page). Then, the block # and the physical page # of the new physical page is stored in the block #1104 and the physical page #1105 corresponding to the logical page being the update target.

FIG. 11 is a view illustrating a configuration of a block management table.

The block management table 1150 is a table for managing the states of a block/physical page. Information related to the physical page in the SSD 21 is stored in each record of the block management table 1150. The block management table 1150 includes columns of a block #1151, a physical page #1152, a status 1153, an error bit count 1154, and an erase count 1155.

The block #1151, the physical page #1152 and the status 1153 are the same information as the block #1104, the physical page #1105 and the status 1103 in the logical-physical conversion table 1100, respectively. That is, if a certain physical page is allocated to the logical page, the block # and the physical page # of the allocated physical page is stored in the block #1104 and the physical page #1105 in the logical-physical conversion table 1100, and "allocated" is stored in the status 1103. At the same time, "allocated" is also stored in the status 1153 (within the block management table 1105) of the allocated physical page.

In the status 1153 of the physical page not allocated to the logical page, "unallocated" or "unused" is stored. After the physical page has been allocated to the logical page and data write has been performed, there may be a case where the allocation of the physical page to the logical page is cancelled. One example is where the SSD controller 200 performs overwrite to the logical page. In that case, the allocation to the logical page of the physical page having been allocated to the overwrite target logical page is cancelled, and "unallocated" is set in the status 1153.

Meanwhile, "unused" is set in the status 1153 of the physical page not allocated to the logical page and where write has not been performed. The physical page whose status 1153 is "unused" is in a state where data write is possible, but the physical page whose status 1153 is "unallocated" is in a state where data write (overwrite) is not possible. In order to set the physical page whose status 1153 is "unallocated" to a state where data write is enabled, it is necessary to erase the block to which the physical page belongs through reclamation processing. The status 1153 of all physical pages within the block being erased is changed to "unused".

The status 1153 may also be set to one of the following two states, which are "blockade" and "blockade (reservation)". "Blockade" indicates a state where the relevant block or physical page is in a blocked state and is currently not used. "Blockade (reservation)" indicates a state where the relevant block or physical page requires a blockade processing, and that execution of processing is awaited. If there is a block determined as requiring blockade in the FM diagnosis processing described later, the SSD controller 200 changes the status 1153 of the relevant block to "blockade (reservation)". After that, the SSD controller 200 changes the status 1153 of the block to "blockade" when executing the capacity reduction processing.

The number of error bits that was observed when the SSD21 performed the FM diagnosis processing described later is stored in the error bit count 1154. The term "error bit" used in the present specification will now be described. When information is to be stored in the area of the flash memory chip, there are cases where correct information cannot be stored or the content of stored information will be changed after the image is stored. In the present specification, this phenomenon is called that "error has occurred". A one-bit area where error has occurred (or one bit data read from the one-bit area where error has occurred) in the FM chip 210 is called "error bit". The cause of occurrence of error can be, for example, the area being rewritten for many times and deteriorated, or the quality of the area (ability to maintain the content of stored data) being bad from the beginning. The SSD 21 according to the present embodiment performs an error check using the ECC when the downstream I/F 203 reads the physical page, and if error occurs, it can detect the number of error bits. In the present specification, the number of error bits detected during reading of the physical page is called "number of error bits". The details will be described in the description of a FM diagnosis processing.

The erase count 1155 stores an accumulated number of times of block erase.

In the following description, the flow of the respective processes will be described.

Figure 12:
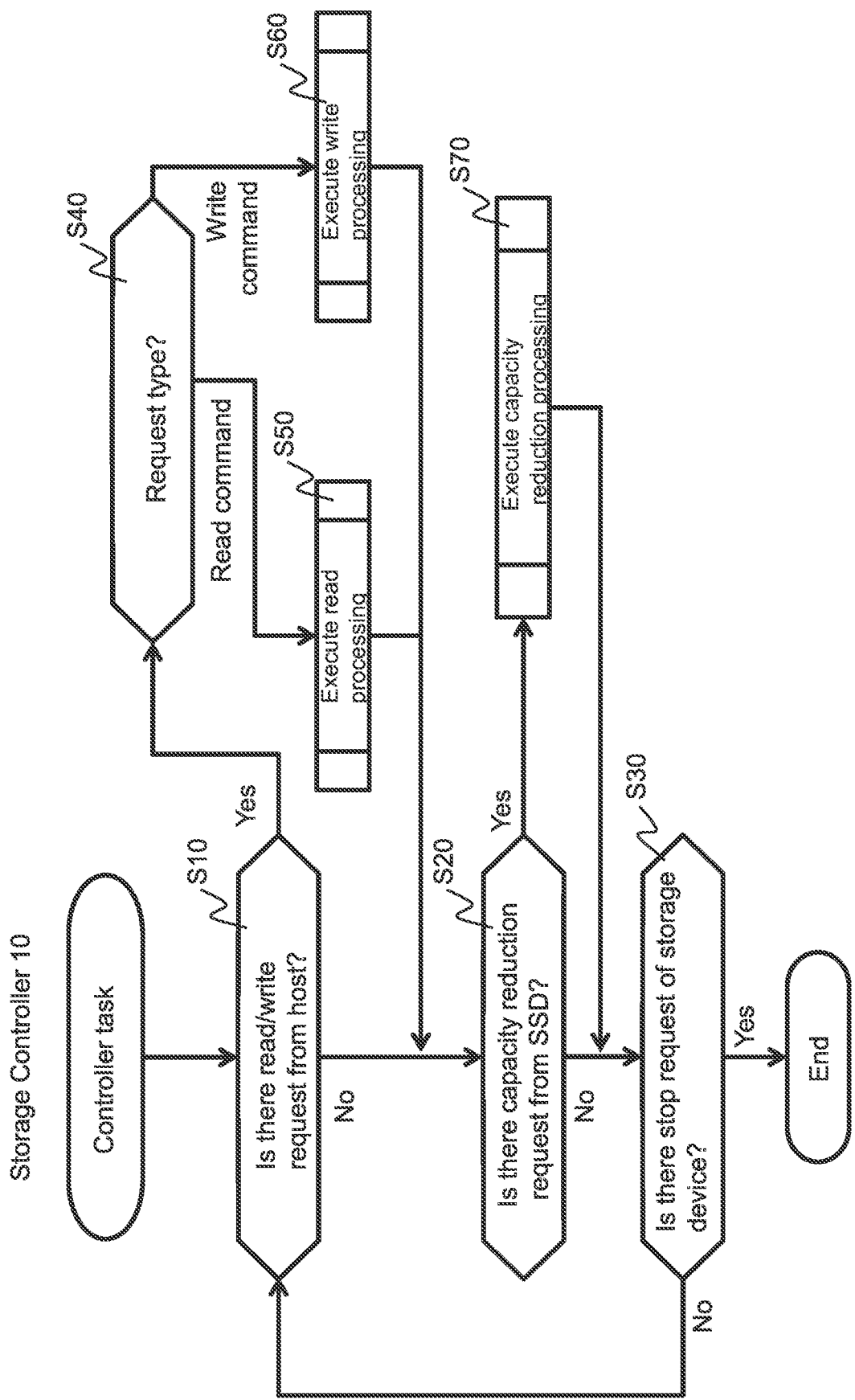
FIG. 12 is a flowchart of a storage controller task.

FIG. 12 is a flowchart of a storage controller task. The storage controller task is executed by a CPU 11 in the storage controller 10 executing a control program. The CPU 11 executes this storage controller task periodically. In the following description, the respective processes are described with the storage controller 10 set as the subject, but unless stated otherwise, it means that the respective processes are executed by the CPU 11.

The storage controller 10 judges whether a read request or a write request has been received from the host computer 2 (S10). If no request has been received (S10: No), the storage controller 10 executes S20.

If a read or a write request has been received (S10: Yes), the storage controller 10 judges whether the request is a read command or a write command (S40). If this request is a read command (S40: read command), the storage controller 10 executes a read processing (S50). If this request is a write command (S40: write command), the storage controller 10 executes a write processing (S60). The details of the read processing and the write processing will be described later (refer to FIGS. 13 and 14). Further, the storage controller 10 performs the process of S20 after performing the process of S50 or S60.

In S20, the storage controller 10 judges whether a capacity reduction request from the SSD 21 has been received or not. If it is determined that there is no capacity reduction request (S20: No), the storage controller 10 performs the process of S30 next. If it is determined that there has been a capacity reduction request (S20: Yes), the storage controller 10 executes the capacity reduction processing (S70), and thereafter, performs the process of S30. The details of the capacity reduction processing will be described later (refer to FIG. 18).

In S30, the storage controller 10 judges whether a stop request of the storage device 1 has already been received. The stop request of the storage device 1 is notified from the management host 5 by the user issuing a stop instruction through the management host 5.

If a stop request is already received (S30: Yes), the storage controller 10 executes a stop processing of the storage device 1, and ends the processing. If a stop request is not yet received (S30: No), the storage controller 10 repeats the processing from S10.

Figure 13:
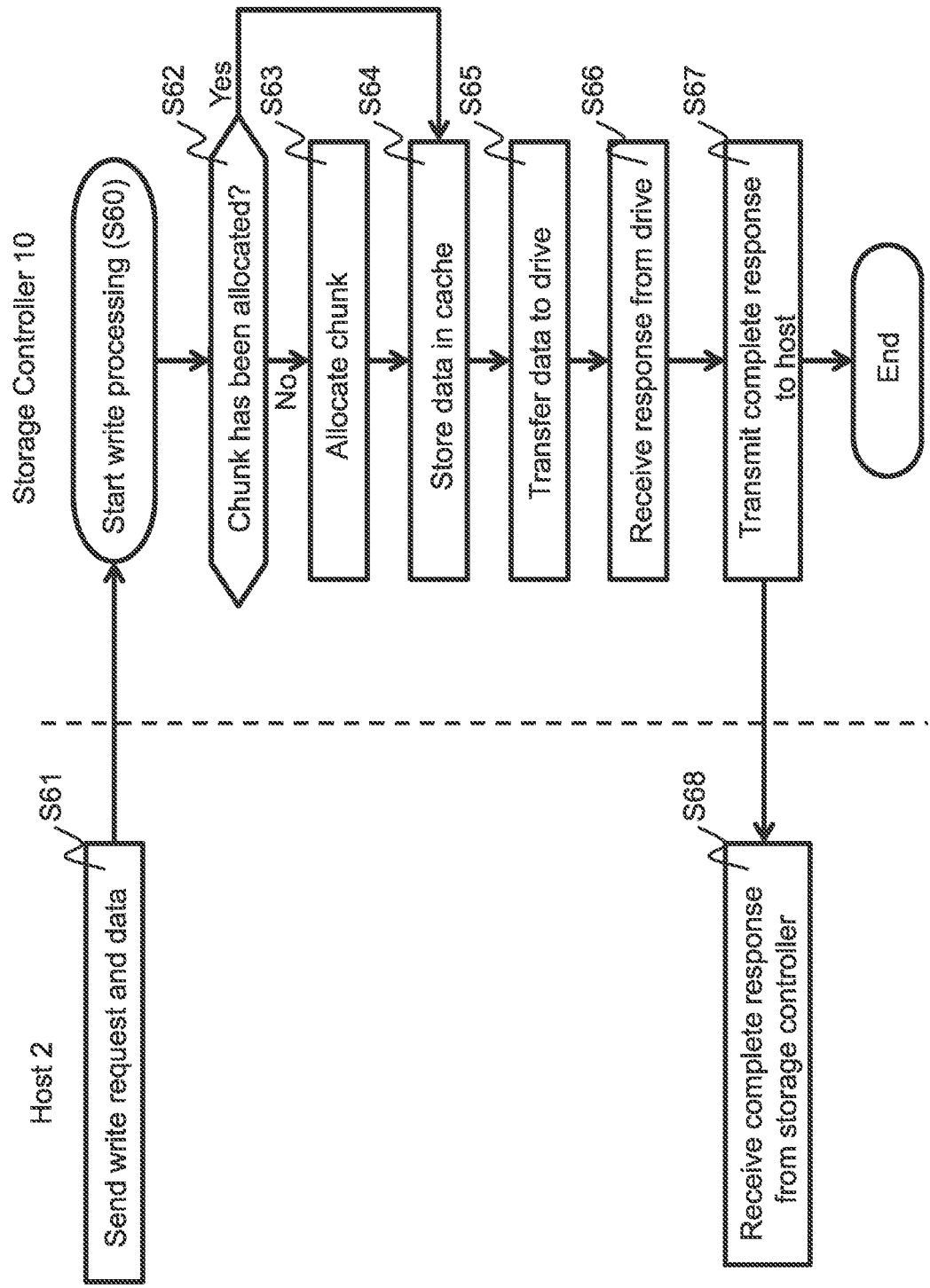
FIG. 13 is a flowchart of a write processing of the storage controller.

FIG. 13 is a flowchart of the write processing executed by the storage controller. The processing corresponds to S60 in FIG. 12.

The host 2 transmits a write command and write data to the storage controller 10 (S61). When the storage controller 10 receives a write command from the host 2, it refers to the virtual volume management table 500 and the pool management table 550, and judges whether a chunk is already allocated to the virtual chunk including the write destination address of the virtual volume designated by the write command (S62).

If a chunk is not allocated to the write destination virtual chunk (S62: No), the storage controller 10 selects an unused chunk (a chunk whose status 555 in the pool management table 550 is "unallocated") and allocates the selected unused chunk to the write destination virtual chunk. Then, the storage controller 10 updates the contents of the virtual volume management table 500 and the pool management table 550 (S63). If a chunk is already allocated to the write destination virtual chunk (S62: Yes), the storage controller 10 will not execute S63.

Thereafter, the storage controller 10 stores the write data in the cache (S64), and transmits the write command and write data to the write destination storage device (S65). Here, it is necessary to perform a process to convert the address designated in the write command to the write destination storage device and the address within write destination SSD 21, but this process is similar to the address conversion performed in conventional storage devices, so that the description thereof will be omitted. The storage controller 10 receives a write complete notice from the write destination storage device (S66). The storage controller 10 transmits a complete response of the write command to the host 2 (S67). The host 2 receives a complete response to the write command from the storage controller 10 (S68), and ends the process.

Figure 14:
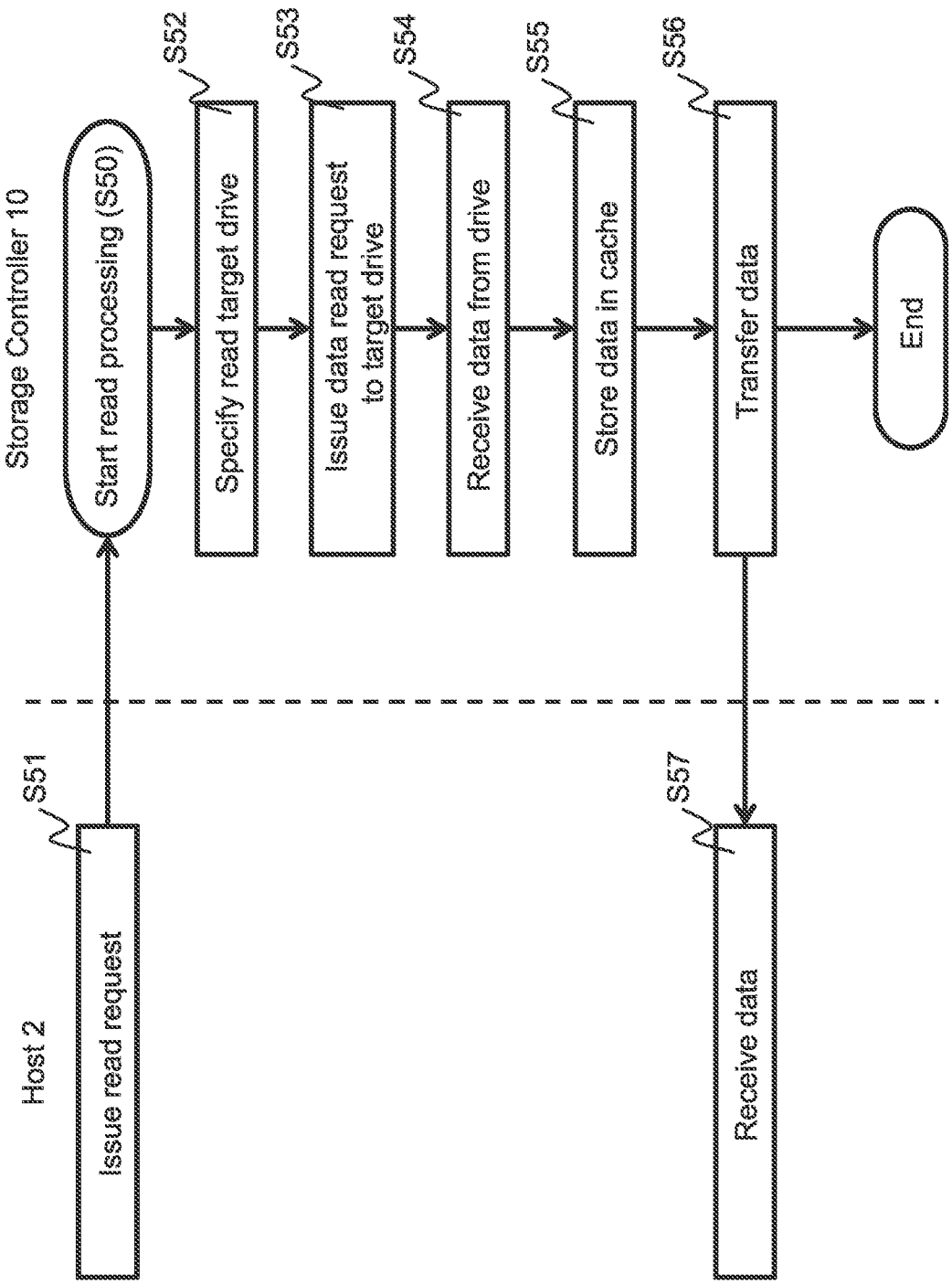
FIG. 14 is a flowchart of a read processing of a storage controller.

FIG. 14 is a flowchart of data read processing of the storage controller. This processing corresponds to S50 in FIG. 12.

The host 2 transmits a read command to the storage controller 10 (S51). When the storage controller 10 receives a read command from the host 2, it specifies the virtual chunk including the virtual volume address designated in the read command. Further, the storage controller 10 uses the virtual volume management table 500 to specify the chunk allocated to the virtual chunk, and using the pool management table 550 and the RAID group management table 650, specifies the read destination storage device among the storage devices configuring the chunk (S52). The storage controller 10 transmits a read command to the specified storage device (S53).

After S53, the storage controller 10 receives the read data from the storage device (S54), and stores the read data in the cache (S55). The storage controller 10 transmits the complete response and read data corresponding to the read command to the host 2 (S56). The host 2 receives the complete response and read data from the storage controller 10 (S57), and ends the process.

Figure 15:
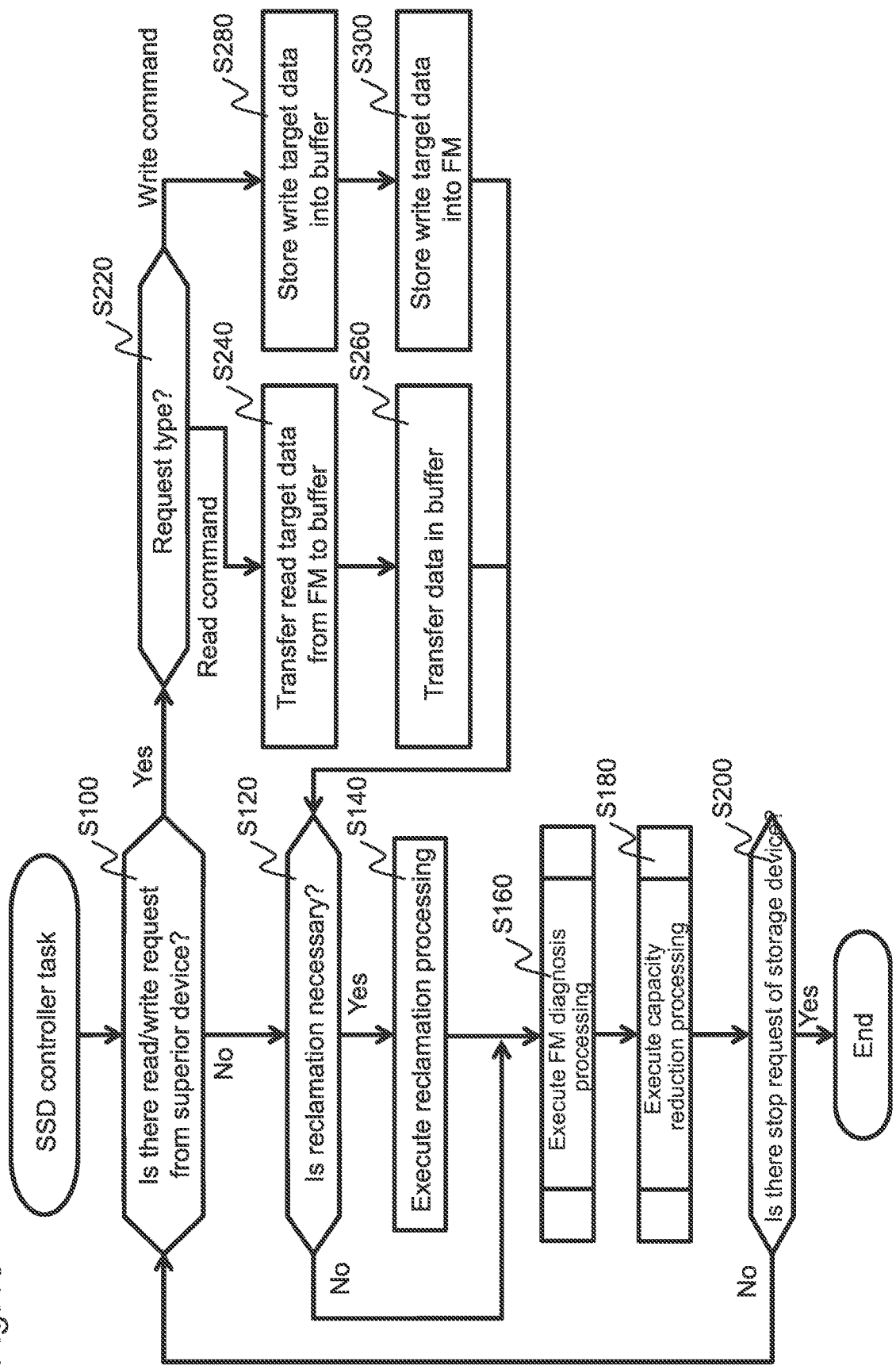
FIG. 15 is a flowchart of an SSD controller task.

FIG. 15 is a flowchart of an SSD controller task. The CPU 201 in the SSD controller 200 executes the SSD controller task periodically. In the following description, the respective processes are described with the SSD controller 200 as the subject, but unless stated otherwise, it means that the respective processes are executed by the CPU 201.

The SSD controller 200 judges whether a read or write request have been received from the storage controller 10 serving as an external device (S100). If a request has not been received (S100: No), the SSD controller 200 advances to S120. If a request from the external device has been received (S100: Yes), the SSD controller 200 determines the contents of the request (S220).

If this request is a read command (S220: read command), the SSD controller 200 transfers data to a buffer from a physical page storing the read target data based on the information in the logical-physical conversion table 1100 (S240), and thereafter, transfers the data stored in the buffer to the external device (S260).

If this request is a write command (S220: write command), the SSD controller 200 first stores the write target data in the buffer (S280), and thereafter, specifies an unused physical page (a physical page whose status 1153 is "unused" in the block management table 1150), and stores the data stored in the buffer into the specified physical page (S300). The SSD controller 200 also updates the contents of the logical-physical conversion table 1100 so that the physical page where the data was stored this time is mapped to the logical page corresponding to the address (SSD LBA) designated in the write command. Further, the SSD controller 200 changes the status 1153 of the physical page having been mapped to the logical page among the physical pages managed by the block management table 1150 to "unallocated", and changes the status 1153 of the physical page currently storing the data to "allocated". After executing the processing related to the read command or the write command received from the external device, the SSD controller 200 executes the processing of S120 and thereafter.

In S120, the SSD controller 200 judges whether a reclamation processing is necessary or not (S120). If there is no need to perform the reclamation processing (S120: No), the SSD controller 200 advances to S160. If there is a need to perform reclamation processing (S120: Yes), the SSD controller 200 executes the reclamation processing (S140).

A reclamation processing is a processing for enabling blocks of the flash memory that have once been used to be reused. In the reclamation processing, one or more blocks are erased to generate a reusable block. By executing the present processing, one is added to the erase count 1157 of the block having been erased by the reclamation processing. Further, the reclamation processing is performed when unused physical pages (or blocks) become insufficient. Therefore, in S120, the SSD controller 200 judges whether reclamation processing is necessary or not by judging whether the number of unused physical pages (or blocks) has fallen below a predetermined number.

Figure 16:
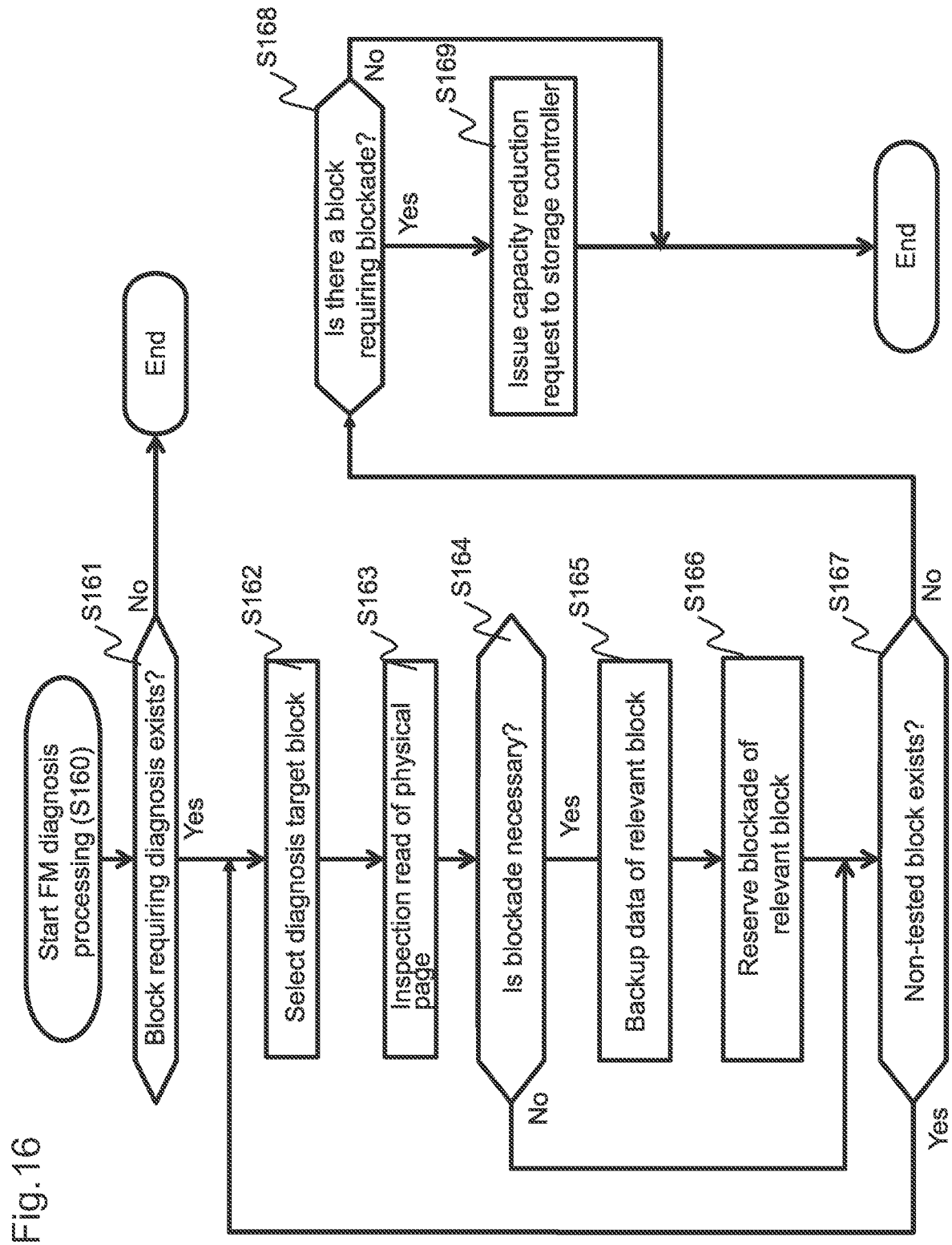
FIG. 16 is a flowchart of an FM diagnosis processing.
Figure 17:
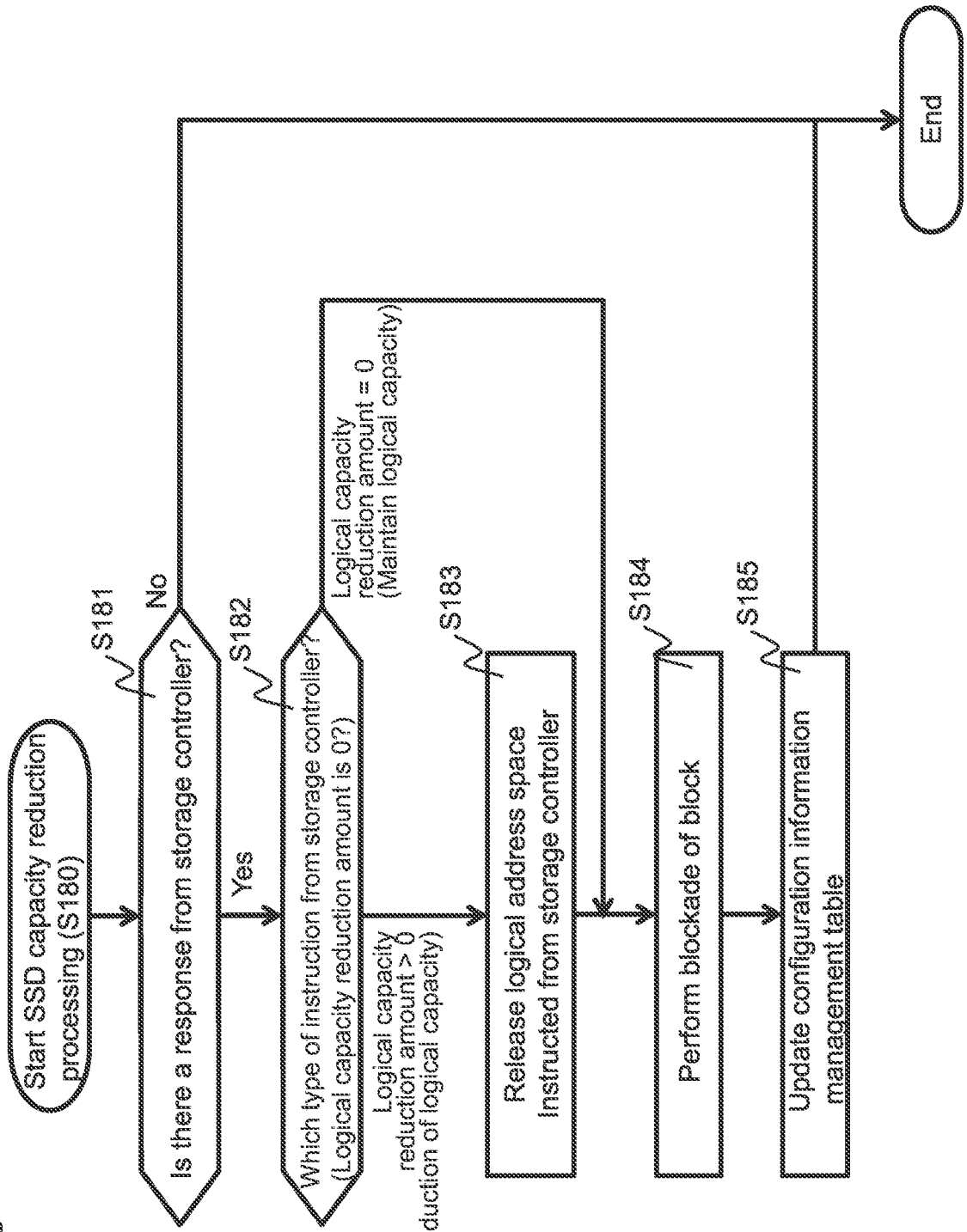
FIG. 17 is a flowchart of a capacity reduction processing of the SSD controller.

In S160, the SSD controller 200 executes an FM diagnosis processing (S160). The details of the FM diagnosis processing will be described later (FIG. 16). In S180, the SSD controller 200 executes the capacity reduction processing (S180). The capacity reduction processing will be described later (FIG. 17).

In S200, the SSD controller 200 judges whether a stop request of the SSD 21 has been received or not (S200). The stop request of the SSD 21 is notified from the storage controller 10. For example, if the storage controller 10 receives a stop request of the storage device 1 from the management host 5, the storage controller 10 issues a stop request to each SSD 21. If a stop request is already received (S200: Yes), the SSD controller 200 executes a stop processing of the SSD 21, and ends the processing. If a stop request is not yet received (S200: No), the SSD controller 200 repeats the processing from S100.

FIG. 16 is a flowchart of FM diagnosis processing (S160 in FIG. 15).

The SSD controller 200 judges whether a block requiring diagnosis exists (S161). For example, the controller 200 may determine that a block requiring diagnosis exists if a predetermined time has elapsed from execution of the previous FM diagnosis processing. Or it may determine that a block requiring diagnosis exists if some specific event occurs, for example, if a specific command such as an instruction to execute diagnosis is received from the storage controller 10, or if a block (or page) exists whose number of erase of blocks or number of accesses to a page has reached N times. If it is determined that diagnosis is not necessary (S161: No), the SSD controller 200 ends the processing.

If it is determined that diagnosis is necessary (S161: Yes), the SSD controller 200 selects one block requiring diagnosis (S162), and reads the data in the physical page within the diagnosis target block (S163). The read processing of the physical page performed in S163 is called "inspection read". In S163, all physical pages can be read, but only a part of the pages may be read. If only a part of the pages is read, for example, only the physical pages storing data (physical pages having the status 1153 set to "allocated"), or only specific pages, such as the pages whose physical page numbers are even numbers or odd numbers, may be read. Further, during the inspection read process, the CPU 201 is notified of information regarding the number of error bits that occurred in the physical page subjected to inspection read, and whether uncorrectable error has occurred or not, from the downstream I/F 203.

In S164, as a result of inspection read in S163, the SSD controller 200 judges whether blockade of a block is necessary, that is, whether a block is in an unusable state. For example, if the number of error bits has exceeded a predetermined threshold, the SSD controller 200 determines that a blockade of a block is necessary.

If it determined that blockade is necessary (S164: Yes), the SSD controller 200 performs backup of data of the block subjected to inspection read (S165). Backup of data refers to a process of migrating a data in a physical page storing data among the physical pages within the block to a different block. The SSD controller 200 checks whether there is a physical page mapped to a logical page in the block subjected to inspection read. If there is a physical page mapped to the logical page, the SSD controller 200 notifies the storage controller 10 of an address of the logical page (SSD LBA 1101) mapped to this physical page.

The storage controller 10 having received the notification of logical page address recovers data by executing a rebuild processing using RAID technique, and the recovered data is rewritten to the logical page. When the SSD controller 200 receives a data write request to the logical page from the storage controller 10, it writes data to a physical page that differs from the physical page having been mapped to the logical page, and updates the logical-physical conversion table 1100 (performs a process to map the physical page to which data is currently written to the logical page), so as a result, data is subjected to backup.

There may be a case where the block determined as requiring blockade in S164 includes a physical page that is not in an unreadable state (state where uncorrectable error has not occurred). Since the storage controller 10 does not need to perform rebuild processing to such physical page, the SSD controller 200 should simply migrate the data stored in that physical page to a physical page in a different block. In that case, update of the logical-physical conversion table 1100 is performed after data migration.

In S166, the SSD controller 200 reserves a blockade processing of the block subjected to inspection read. The blockade is performed in block units. Therefore, the SSD controller 200 changes the status 1153 of all the physical pages in the block including the physical page subjected to inspection read in S163 to "blockade (reservation)". The actual blockade processing is carried out in the capacity reduction processing (FIG. 17) described later.

If block(s) which is/are the target of diagnosis still remain(s) (S167: Yes), the SSD controller 20 repeats the processing again from S162. If inspection read has been performed to all the blocks which are the target of diagnosis (S167: No), the SSD controller 200 judges whether there is a block requiring blockade by checking whether there is a block whose status 1153 in the block management table 1150 is "blockade (reservation)" (S168).

If there is no block requiring blockade (S168: No), the process is ended. If there is a block requiring blockade, the SSD controller issues a capacity reduction request to the storage controller 10 (S169), and ends the process. The capacity reduction request includes, in addition to the identifier of the SSD 21 issuing the capacity reduction request, a total size of the blocks requiring blockade, that is, the total size of the block(s) whose status 1153 is/are "blockade (reservation)". In the following description, the total size of the blocks requiring blockade is called "blockade scheduled capacity". The storage controller 10 having received the capacity reduction request returns a response information instructing either to allow reduction of logical capacity or to maintain the logical capacity, the details of which will be described later.

FIG. 17 is a flowchart of a capacity reduction processing of an SSD controller. At first, the SSD controller 200 judges whether a response information corresponding to a capacity reduction request has been received from the storage controller 10, and if a response information has not been received (S181: No), the process is ended. If a response information has been received (S181: Yes), the SSD controller 200 performs the processes of S182 and thereafter.

Figure 19:
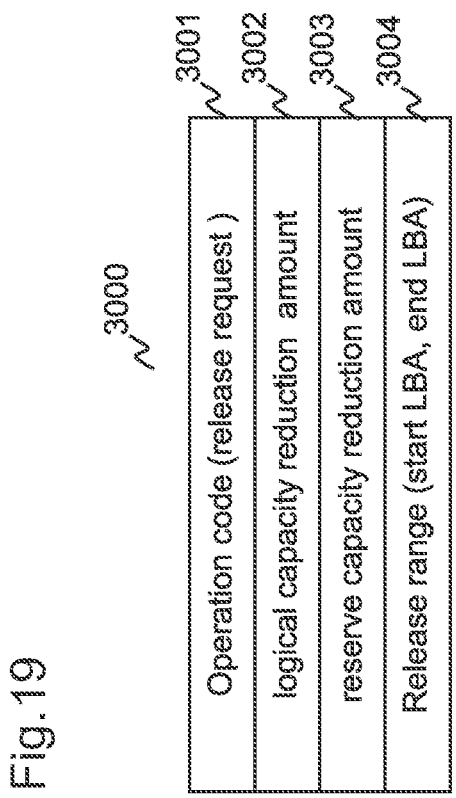
FIG. 19 is a view illustrating an example of format of a release command.

We will describe the response information regarding the capacity reduction request that the storage controller 10 transmits to the SSD 21. The storage controller 10 transmits a release command as response information regarding the capacity reduction request to the SSD 21. A format of the release command will be illustrated in FIG. 19. A release command 3000 includes information of an operation code 3001, a logical capacity reduction amount 3002, a reserve capacity reduction amount 3003, and a release range 3004.

The operation code 3001 is information indicating that a type of command is a release command. The logical capacity reduction amount 3002 and the reserve capacity reduction amount 3003 are respectively the size of the logical capacity whose reduction is permitted and the size of the reserve capacity whose reduction is permitted. If a value of 1 or greater is stored in the logical capacity reduction amount 3002, and if the reserve capacity reduction amount 3003 is 0, it means that the storage controller 10 instructed (permitted) reduction of logical capacity.

On the other hand, if the logical capacity reduction amount 3002 is 0, and a value of 1 or greater is stored in the reserve capacity reduction amount 3003, it means that the storage controller 10 instructed the SSD 21 to maintain the logical capacity. If the SSD 21 receives such command, the SSD 21 must reduce the reserve capacity.

In the release command created according to the storage device 1 of the first embodiment, at least one of the logical capacity reduction amount 3002 and the reserve capacity reduction amount 3003 is set to 0. However, a positive value can be stored in both the logical capacity reduction amount 3002 and the reserve capacity reduction amount 3003. An example in which such command is issued will be described with reference to the second embodiment.

The release range 3004 includes information (start LBA and end LBA) indicating a range of the area in the logical address space of the SSD 21 where the mapping of the physical page can be cancelled.

We will return to the description of capacity reduction processing of the SSD controller. If the SSD 21 receives a response information (that is, a release command) (S181: Yes), the SSD controller 200 checks the instruction from the storage controller 10 by analyzing the content of the release command (S182). If the instruction from the storage controller 10 is "maintain logical capacity", that is, if the logical capacity reduction amount 3002 is 0, the SSD controller 200 executes S184 thereafter.

If the instruction from the storage controller 10 is "reduce logical capacity", that is, if the logical capacity reduction amount 3002 is a positive value, the SSD controller 200 performs a release processing of the physical page of the range designated by the release range 3004 (S183). Specifically, the SSD controller 200 checks the record whose SSD LBA 1101 of the logical-physical conversion table 1100 corresponds to the release range 3004, wherein if the status 1103 thereof is "allocated", the SSD controller 200 changes the status 1103 to "unallocated", and in order to set the physical page specified by the block #1104 and the physical page #1105 of that record to an unallocated state, the SSD controller 200 changes a status 1153 of that physical record managed by the block management table 1150 to "unallocated". Further, the block #1104 and the physical page #1105 are also changed to NULL.

In S184, the SSD controller 200 performs blockade of block(s) whose status 1153 in the block management table 1150 is/are "blockade (reservation)" by changing the status 1153 to "blockade".

In S185, the SSD controller 200 reduces the logical capacity 1302 or the reserve capacity 1303 of the configuration information management table 1300. If the instruction from the storage controller is "allow reduction of logical capacity", the logical capacity 1302 is reduced, and if the instruction from the storage controller is "maintain logical capacity", the reserve capacity 1303 is reduced. The reduction amount of the logical capacity 1302 or the reserve capacity 1303 is included in the release command 3000, and the reduction amount is equal to a total size of the blocks blocked in S184. Further, the SSD controller 200 adds the total size of the blocks being blocked in S184 to the blocked capacity 1304, and ends the processing.

Figure 18:
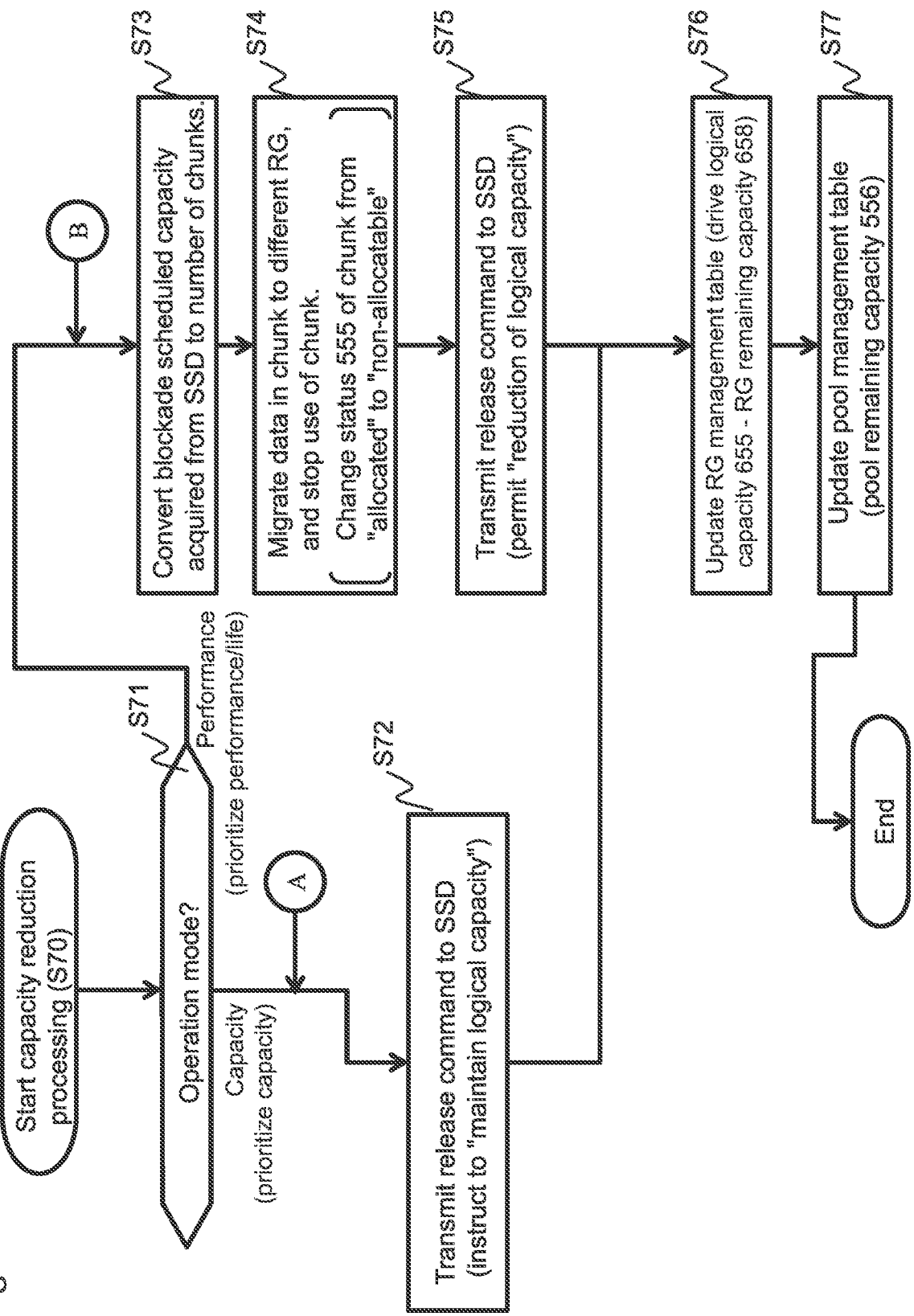
FIG. 18 is a flowchart of a capacity reduction processing of the storage controller.

FIG. 18 is a flowchart of capacity reduction processing executed in the storage controller 10. This processing is executed when a capacity reduction request is received from the SSD 21.

In the following description, the SSD 21 having notified the capacity reduction request is called a "target SSD". Further, the RAID group to which the target SSD belongs is called a "target RAID group".

The storage controller 10 specifies the RAID group (target RAID group) to which the target SSD belongs by referring to the RAID group management table 650, and acquires the operation mode 660 set to the target RAID group (S71). Since the information for specifying the SSD 21 issuing the request (such as the identifier of the SSD 21) is included in the capacity reduction request received by the storage controller 10, the RAID group to which the target SSD belongs can be specified based on the information.

If the operation mode 660 is "capacity", the storage controller 10 transmits a command instructing to maintain the logical capacity to the target SSD (S72). Specifically, the storage controller 10 creates the release command 3000 described above. Value 0 is stored in the logical capacity reduction amount 3002 of the release command 3000 created here, a total size of the block requiring blockade designated by the capacity reduction request issued by the target SSD is stored in the reserve capacity reduction amount 3003, and an invalid value (NULL) is stored in the release range 3004. Thereafter, the processes of S76 and thereafter are performed, which will be described in detail later.

If the operation mode 660 is "performance", the storage controller 10 permits reduction of the logical capacity of the target SSD. If the logical capacity of the SSD 21 is reduced, it means that the capacity of the RAID group to which the SSD 21 belongs is reduced, and as a result, the number of chunks that can be created in the RAID group is reduced. Therefore, before permitting reduction of logical capacity of the target SSD, the storage controller 10 computes the chunk that must be reduced within the target RAID group, and migrates the data stored in the chunk to a different RAID group.

In S73, the storage controller 10 computes the number of chunks that must be reduced in the target RAID group based on the blockade scheduled capacity of the target SSD included in the capacity reduction request. The method for computing the number of chunks that must be reduced will be described briefly. At first, the storage controller 10 computes a capacity of the RAID group at the current point of time (prior to capacity reduction). The capacity of the RAID group is computed by multiplying the logical capacity of the SSD 21 having the minimum logical capacity among the SSDs 21 constituting the RAID group by N (N being the number of SSDs 21 constituting the RAID group). The logical capacity can be acquired by referring to a drive logical capacity 655 of the RAID group management table 650. The number of chunks that can be used in the RAID group at the current point of time can be computed by dividing the capacity of the RAID group obtained above by the size of one chunk. In the following description, the number of chunks that can be used in the RAID group at the current point of time is referred to as C.

Next, the storage controller 10 computes a logical capacity after reduction of the logical capacity of the target SSD by subtracting the blockade scheduled capacity from the drive logical capacity 655 of the target SSD registered in the RAID group management table 650. Thereafter, the capacity of the target RAID group after reduction of the logical capacity is computed using the logical capacity after reduction of the logical capacity of the target SSD, and further, the number of chunks that can be used within the target RAID group after reduction of the logical capacity is computed. In the following description, the number of chunks usable in the target RAID group after reduction of logical capacity is referred to as C'. The value (C-C') is the number of chunks that must be reduced (the number of chunks that can no longer be allocated to the virtual chunk).

Next, the storage controller 10 selects (C-C') chunks as the chunks being the target of reduction. The chunks selected here are called migration source chunks. If necessary, the storage controller 10 moves the data in the chunk to a different RAID group (S74). The migration source chunk may be any arbitrary chunk within the target RAID group. However, it is preferable to select a chunk which is not mapped to a virtual chunk. This is because the data in a chunk which is not mapped to a virtual chunk is not required to be migrated to a different RAID group.

If the storage controller 10 selects a chunk mapped to a virtual chunk as the migration source chunk, the data in this chunk (migration source chunk) is migrated to an unused chunk of a different RAID group (called migration destination chunk). Further, the storage controller 10 updates the content of the virtual volume management table 500 so that the migration destination chunk is mapped to the virtual chunk to which the migration source chunk had been mapped. Further, the storage controller 10 changes the status 555 of the migration source chunk within the pool management table 550 to "non-allocatable".

The RAID level 654 of the RAID group to which the migration source chunk belongs can be the same as or different from the RAID level 654 of the RAID group to which the migration destination chunk belongs. If the RAID levels 654 differ, recalculation of parity is required when data is migrated.

Thereafter, the storage controller 10 creates and transmits a command (release command) to permit reduction of logical capacity to the target SSD (S75). The total size of the block that must be blocked designated in the capacity reduction request issued by the target SSD is stored in the logical capacity reduction amount 3002 of the release command 3000 created here, and 0 is stored in the reserve capacity reduction amount 3003. Further, the storage controller 10 computes an address range of the target SSD included in the migration source chunk, and stores the computed address range in the release range 3004.

Further, in S75, the storage controller 10 creates and transmits release commands to the SSDs 21 belonging to the target RAID group other than the target SSD. The release range 3004 of the release command 3000 transmitted to these SSDs 21 store the same value as the release command transmitted to the target SSD, but 0 is stored in the logical capacity reduction amount 3002 and the reserve capacity reduction amount 3003. The SSD 21 having received this release command performs release processing of the physical pages mapped in the range designated by the release range 3004 (that is, performs only S183 of FIG. 17). However, reduction of logical capacity and reserve capacity is not performed.

Finally, the storage controller 10 updates drive logical capacity 655—RAID group remaining capacity 658 in the RAID group management table 650 (S76), updates the remaining capacity of pool 556 in the pool management table 550 (S77), and ends the processing. If a command notifying that the logical capacity should be maintained is transmitted to the target SSD (S72), update of drive logical capacity 655—RAID group remaining capacity 658 in the RAID group management table 650 is performed, but the drive logical capacity 655, the RAID group remaining capacity 658 and the remaining capacity of pool 556 are not updated (update is not necessary).

The above has described the processing performed in the storage device according to the first embodiment. According to the storage device of the first embodiment, when blockade of the block of the SSD 21 is to be done, selection is performed on whether to reduce the logical capacity or reduce the reserve capacity according to the policy (operation mode 660) set for the RAID group. If the user (administrator) of the storage device 1 does not wish to reduce the logical capacity provided to the storage controller 10, a policy to maintain the capacity should be set, according to which the logical capacity is maintained. In contrast, if the user wishes to prevent deterioration of performance and deterioration of life of the SSD 21, a policy to maintain performance should be set, according to which the reserve capacity is maintained and the logical capacity is reduced. Thereby, operation corresponding to the needs of the user can be realized.

In the above description, an example has been described in which a policy (operation mode 660) is set for each RAID group, but the policy can also be set for each SSD or for each pool. In another example, only one policy can be set for the storage device.

In the above description, an example has been described in which the number of error bits which were occurred is used for determining the need to perform blockade of a block in the FM diagnosis processing, but other information can also be used. For example, if an uncorrectable error occurs as a result of the inspection read, the SSD controller 200 can determine that blockade of a block in which uncorrectable error has occurred is necessary. Further, if the erase count (1155) of a block has exceeded a predetermined threshold, the SSD controller 200 can determine that blockade of the block is necessary.

Or, it is also possible to manage the history of the number of occurrence of error bits that have been detected in the past in the block management table 1150, compute the increasing rate of the number of occurrence of error bits in the SSD controller 200, and perform blockade of a block at a timing when the increasing rate of the number of occurrence of error bits starts to increase. Further, whether or not to perform blockade is determined for each block according to the above-described example, but whether to perform blockade can also be determined in other units (such as in die units).

Second Embodiment

Next, a storage device according to a second embodiment will be described. A configuration of the storage device according to the second embodiment is the same as that described in the first embodiment. Further, the hardware configuration of SSD according to the second embodiment is the same as that described in the first embodiment.

In the first embodiment, an example has been described of a case where, if a policy (operation mode) set for the RAID group is "capacity", the logical capacity is maintained and the reserve capacity is reduced, and if the operation mode set for the RAID group is "performance (or life)", the logical capacity is reduced when the capacity of the SSD is reduced. In the second embodiment, an example of a storage device also supporting other operation modes will be described.

In a memory device using the flash memory as a storage medium, the amount of data actually written by the memory device to the storage media (FM chips) tends to be greater than the amount of write data that the memory device receives from the external device, such as the storage controller. This phenomenon is called WA (Write Amplification). In the present embodiment, the value computed by the following expression is called a Write Amplification Factor (WAF):

$$\text{amount of data written into the FM chips} \div \text{amount of data written from an external device}$$

In the storage device according to the second embodiment, the SSD 21 observes the amount of data written to the respective FM chips 210 and the amount of write data received from the storage controller 10. Then, the SSD 21 computes WAF as required, and stores and manages the value in WAF 1306 of the configuration information management table 1300. However, it is not necessary that the SSD 21 manages the WAF.

As the value of WAF increases, it means that a greater amount of additional processing is performed within the SSD 21. Therefore, if the WAF of the SSD 21 is great, compared to the case where the WAF is small, the performance of the SSD 21 is deteriorated. From the viewpoint of maintaining performance, it is preferable that the WAF is not increased. In the storage device according to the second embodiment, a mode for maintaining the WAF to a fixed value (WAF maintaining mode) is supported as the operation mode during reduction of capacity of the SSD 21.

Generally, the value of WAF tends to depend on the ratio of the logical capacity and reserve capacity of the SSD 21. Therefore, if the ratio of the logical capacity and reserve capacity does not change before and after reducing capacity of the SSD 21, it is expected that the WAF is maintained at a fixed value. In the storage device according to the second embodiment, if a WAF maintaining mode is designated as the operation mode during reduction of capacity of the SSD 21, the reduction amount of the logical capacity and the reduction amount of the reserve capacity are set so that the values computed by the expression of "reserve capacity÷(logical capacity+reserve capacity)" do not vary before and after reduction of capacity. In the present embodiment, the value computed by the expression "reserve capacity÷(logical capacity+reserve capacity)" is called "reserve capacity ratio".

The concept of the capacity reduction method when the WAF maintaining mode is selected will be described with reference to FIG. 20. The left side of FIG. 20 ((A) initial state) illustrates a relationship between logical capacity and reserve capacity of the SSD 21 before reduction of capacity occurs. In this state, since the logical capacity is 4 and the reserve capacity is 1, the reserve capacity ratio is 0.2 (20% in percentage).

Figure 20:
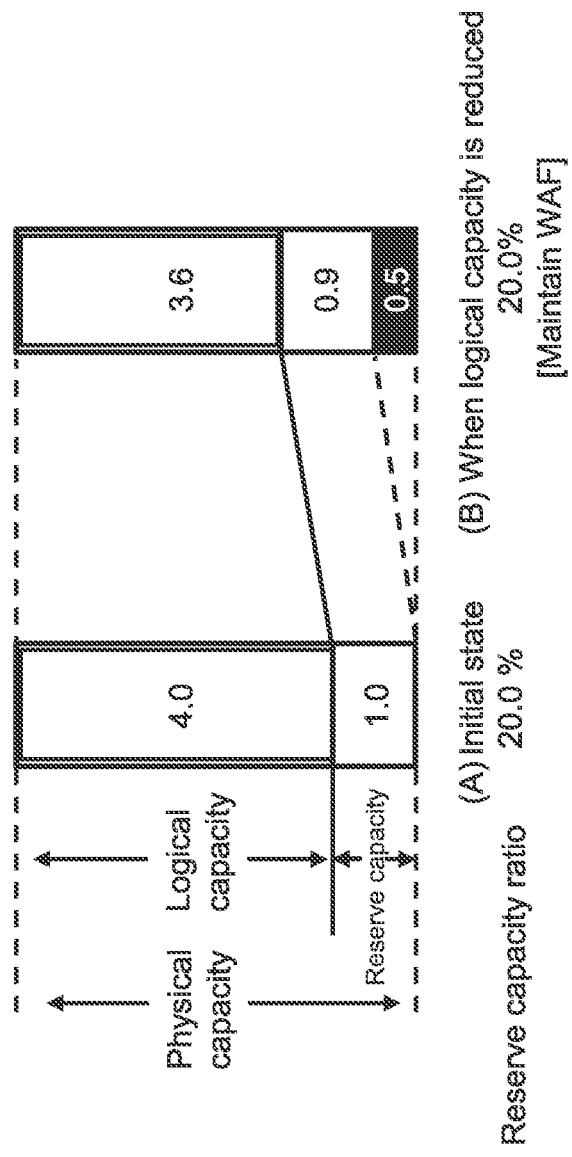
FIG. 20 is a view illustrating a concept of capacity reduction method according to a second embodiment.

The right side of the drawing of FIG. 20 ((B) when reducing logical capacity) illustrates a state in which part of the blocks (block(s) corresponding to capacity 0.5) in the SSD 21 is blocked. In the example of FIG. 20, the logical capacity is reduced by 0.4, and the reserve capacity is reduced by 0.1. If reduction of capacity is performed as described, the logical capacity and the reserve capacity after reduction are 3.6 and 0.9, respectively, and the reserve capacity ratio is 0.2 (in other words, the reserve capacity ratio is not changed before and after capacity reduction, and the WAF is maintained).

If only the logical capacity is reduced by 0.5 (or if only the reserve capacity is reduced by 0.5), the reserve capacity ratio will vary. Therefore, in the WAF maintaining mode, both the logical capacity and the reserve capacity are reduced so that the reserve capacity ratio does not vary.

When the logical capacity before reduction is represented by L, the reserve capacity before reduction is represented by P, and the total size of the block being blocked (blockade scheduled capacity) is represented by B, if the amount of reduction of the logical capacity is set to:

$$L \times B \div (L+P)$$

and the amount of reduction of the reserve capacity is set to:

$$P \times B \div (L+P)$$

the reserve capacity ratio will be the same before and after the reduction, and as a result, it is expected that the WAF is maintained.

In the storage device 1 according to the second embodiment, in order to support the WAF maintaining mode, "WAF" can be set in addition to "performance" and "capacity" as the operation mode 660 in the RAID group management table 650 managed by the storage controller 10.

Figure 21:
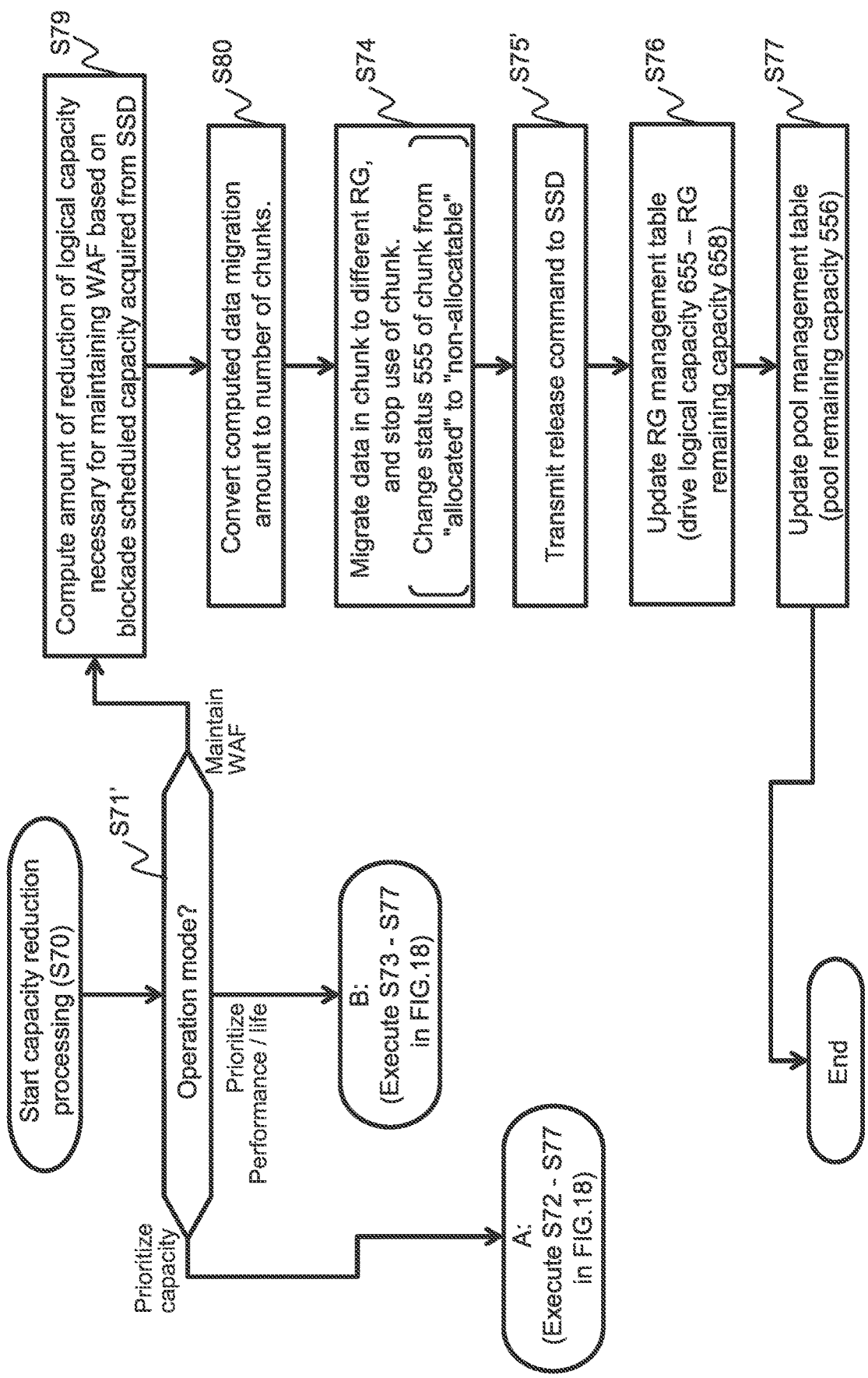
FIG. 21 is a flowchart of capacity reduction processing performed in the storage controller according to the embodiment.

The flow of the capacity reduction processing executed by the storage controller 10 according to the second embodiment will be described with reference to FIG. 21. Similar to the first embodiment, the SSD 21 having notified the capacity reduction request is called "target SSD" in the following description. Further, the RAID group to which the target SSD belongs is called "target RAID group".

In S71', the storage controller 10 checks the operation mode 660 set for the RAID group to which the target SSD belongs (target RAID group). In S71', if the operation mode 660 is "capacity", or if the operation mode 660 is "performance", the same processing as the processing described in the first embodiment will be performed.

If the operation mode 660 is "WAF" (that is, in the WAF maintaining mode), the storage controller 10 computes the reduction amount of the logical capacity and the reduction amount of the reserve capacity (S79). The logical capacity (L) prior to reduction of the SSD 21 is stored in the drive logical capacity 655 of the RAID group management table 650. Further, the reserve capacity (P) prior to reduction of the SSD 21 is stored in the drive reserve capacity 656 of the RAID group management table 650. Therefore, the storage controller 10 can obtain the reduction amount of the logical capacity and the reduction amount of the reserve capacity by substituting these information and the blockade scheduled capacity of the target SSD contained in the capacity reduction request to the expression described above.

Next, the storage controller 10 computes the number of chunks that must be reduced in the target RAID group based on the reduction amount of the logical capacity computed in S79 (S80). The method for computing the number of chunks that must be reduced is similar to the method described in the first embodiment. However, according to the method described in the first embodiment, the blockade scheduled capacity of the target SSD is used to compute the number of chunks that must be reduced, but the present embodiment differs from the first embodiment in that the reduction amount of logical capacity computed in S79 is used in S80.

After S80, the storage controller 10 selects the chunks as the reduction target chunk (migration source chunk), the number of which is equal to the number of chunks obtained in S80, and if necessary, the data in the chunk(s) is migrated to a different RAID group (S74). This is similar to the processing described in the first embodiment.

Thereafter, the storage controller 10 creates a command (release command) to reduce the logical capacity and the reserve capacity and transmits the same to the target SSD (S75'). The values calculated in S79 are stored in the logical capacity reduction amount 3002 and the reserve capacity reduction amount 3003 of the release command 3000 created here. Further, the address range of the target SSD corresponding to the migration source chunk determined in S74 is stored in the release range 3004. Further, similar to S75 of the first embodiment, in S75', the storage controller 10 creates and transmits release commands to the SSDs 21 belonging to the target RAID group other than the target SSD.

Finally, the storage controller 10 executes S76 and S77, and ends the processing. The processing of S76 and S77 is the same as that described in the first embodiment. The above description has described a case where the logical capacity and the reserve capacity are determined such that the reserve capacity ratio (reserve capacity÷(logical capacity+reserve capacity)) does not vary before and after capacity reduction of the SSD 21, but the logical capacity and reserve capacity can be determined similar to the example illustrated above by determining the logical capacity and the reserve capacity such that the "reserve capacity÷logical capacity" does not vary.

Next, the flow of capacity reduction processing executed in the SSD controller 200 according to the second embodiment will be described with reference to FIG. 17. However, since this processing is similar to the flow of processing described in the first embodiment (FIG. 17), only the points that differ from the processing of FIG. 17 will be described.

According to the storage device of the second embodiment, there may be a case where both the logical capacity and the reserve capacity are reduced. Therefore, if the SSD 21 receives a release command storing positive values as both the logical capacity reduction amount 3002 and the reserve capacity reduction amount 3003 from the storage controller 10, in S185, it performs a processing to subtract the value of the logical capacity reduction amount 3002 from the logical capacity 1302, and subtract the value of the reserve capacity reduction amount 3003 from the reserve capacity 1303. The other points are the same as the processing described in the first embodiment.

The above describes the points in the processing performed in the storage device 1 according to the second embodiment that differ from the processing described in the first embodiment. The points of the processing performed in the storage device according to the second embodiment other than those described above are the same as the processing described in the first embodiment. The SSD 21 according to the second embodiment determines the reduction amount of the logical capacity and the reduction amount of the reserve capacity so that the reserve capacity ratios do not change before and after reduction during the capacity reduction processing. If only the logical capacity is maintained, the reserve capacity ratio is reduced and the WAF is increased, such that the performance of the SSD 21 is deteriorated. In contrast, if the reserve capacity is maintained, the processing is effective from the viewpoint of performance, but the storage capacity that the SSD 21 provides to the storage controller 10 will be reduced. According to the SSD 21 of the second embodiment, the reduction amount of the logical capacity can be minimized while maintaining the performance of the SSD 21.

The embodiments of the present invention have been described, but these are mere examples for illustrating the present invention, and are not intended to limit the scope of the present invention to the illustrated embodiments. The present invention can be implemented in other various forms.

For example, according to the embodiment illustrated above, the storage controller 10 transmits a release command including the amount of reduction of logical capacity and the amount of reduction of reserve capacity to the SSD 21, and the SSD 21 reduces the amount corresponding to the amount of reduction of logical capacity (and the amount of reduction of reserve capacity) designated in the release command from the logical capacity (and the reserve capacity). However, as another embodiment, instead of notifying the amount of reduction of logical capacity and the amount of reduction of reserve capacity to the SSD 21, the storage controller 10 can notify only an instruction to maintain the logical capacity, to maintain the reserve capacity, or to maintain the WAF (or reserve capacity ratio).

In that case, the SSD 21 receiving the notice to maintain the logical capacity should reduce the reserve capacity (the reduction amount will be the total amount of block whose status 1153 is set to "blockade (reservation)", and the SSD 21 receiving the notice to maintain the reserve capacity should reduce the logical capacity. The reduction amount of the reserve capacity or the logical capacity at this time is the total amount of the block whose status 1153 is set to "blockade (reservation)".

The SSD 21 receiving the notice to maintain the WAF (or the reserve capacity ratio) computes the amount of reduction of logical capacity and the amount of reduction of reserve capacity such that the reserve capacity ratio does not fluctuate before and after blockade of capacity using the logical capacity 1302 and the reserve capacity 1303 managed by the configuration information management table 1300, and the SSD 21 should reduce the logical capacity (and reserve capacity) corresponding to the calculated amount of reduction of logical capacity (and amount of reduction of reserve capacity).

As another embodiment, if a capacity reduction request is issued from the SSD 21 to the storage device 1, the amount of reduction of logical capacity and the amount of reduction of reserve capacity for maintaining the WAF (or the reserve capacity ration) may be included in the capacity reduction request and notified. Then, if "maintain WAF" is designated as the operation mode of the RAID group to which the SSD 21 belongs, the storage controller 10 should determine the number of chunks to be reduced based on the amount of reduction of logical capacity and the amount of reduction of reserve capacity received from the SSD 21.

The above has illustrated an example in which the amount of reduction of logical capacity and the amount of reduction of reserve capacity are determined based on a policy (operation mode) set by the user, but information other than the policy set by the user can be used for determining the amount of reduction of logical capacity and the amount of reduction of reserve capacity. For example, the SSD 21 can include the WAF in the capacity reduction request notified to the storage controller 10, and the storage controller 10 can determine the amount of reduction of logical capacity and the amount of reduction of reserve capacity based on the WAF received from the SSD 21. For example, if the WAF is greater than a predetermined threshold, the storage controller 10 should reduce the reduction amount of the reserve capacity (or set the reserve capacity to 0) to reduce the WAF, and if the WAF is smaller than a predetermined threshold, the storage controller 10 should determine the amount of reduction of logical capacity and the amount of reduction of reserve capacity based on the policy set by the user.

For example, according to the above-described embodiment, an example has been described in which the data in the chunk of the RAID group configured by the SSD is migrated to a RAID group also configured by the SSD. However, if storage devices other than SSDs, such as HDDs, are connected to the storage device, the data in the chunk can be migrated to a RAID group configured of HDDs.

According further to the above-described embodiments, an example has been illustrated of a configuration where the SSD is installed in a storage controller, but it can also be installed in a host computer. In that case, the host computer is required to hold similar functions (such as the capacity virtualization function) as the storage controller described above.

REFERENCE SIGNS LIST

1: Storage device, 2: host computer, 3: SAN, 5: management host, 10: storage controller, 11: CPU, 12: host I/F, 13: device I/F, 14: memory, 15: management I/F, 21: SSD, 25: HDD, 200: SSD controller, 201: CPU, 202: upstream I/F, 203: downstream I/F, 204: memory, 205: internal connection switch, 210: FM chip, 211: block, 212: page, 213: die.

The invention claimed is:

1. A storage device comprising:
   a storage controller; and
   a plurality of memory devices, each comprising a nonvolatile storage medium and a device controller, each device controller configured to manage a storage area of the nonvolatile storage medium, respectively, the storage area having a capacity equal to that provided to the storage controller as a logical capacity, and to manage a remaining area of the nonvolatile storage medium as a reserve capacity,
   wherein the storage controller manages a RAID (Redundant Array of Independent Disks) group configured using the plurality of memory devices, and stores a policy set for the RAID group,
   wherein upon determining that a part of the storage area of a particular nonvolatile storage medium is in an unusable state, the device controller, corresponding to the particular nonvolatile storage medium notifies the storage controller of a size of the storage area in the unusable state, and
   the storage controller determines a reduction amount of the logical capacity of a particular memory device having the part of the storage area of the nonvolatile storage medium in the unusable state based on the policy, computes a new logical capacity after reduction of the logical capacity of the particular memory device, changes a capacity of the RAID group by multiplying the logical capacity of the memory device having minimum value of the logical capacities of the plurality of memory devices included in the RAID group by a number of the plurality of memory devices included in the RAID group, and transmits the reduction amount of the logical capacity to the particular memory device having the part of the storage area of the nonvolatile storage medium in the unusable state.

2. The storage device according to claim 1,
   wherein the storage controller notifies the reduction amount of the logical capacity and the reserve capacity being determined to the particular memory device, and the corresponding device controller reduces the logical capacity and the reserve capacity based on the reduction amount of the logical capacity and the reserve capacity received from the storage controller.

3. The storage device according to claim 1,
wherein the policy is set to maintain performance, and
the storage controller determines to reduce the logical capacity without reducing the reserve capacity.

4. The storage device according to claim 1,
wherein the policy is set to maintain a Write Amplification Factor (WAF),
the storage controller determines a reduction amount of the logical capacity and the reserve capacity such that a ratio of logical capacity and reserve capacity does not vary before reduction and after reduction of the logical capacity and the reserve capacity of the memory device.

5. A storage device comprising:
a storage controller; and
a plurality of memory devices, each comprising a nonvolatile storage medium and a device controller, each device controller configured to manage a storage area of the nonvolatile storage medium, respectively, the storage area having a capacity equal to that provided to the storage controller as a logical capacity, and to manage a remaining area of the nonvolatile storage medium as a reserve capacity,
wherein the storage controller manages a RAID (Redundant Array of Independent Disks) group configured using the plurality of memory devices, and stores a policy set for the RAID group,
wherein the storage controller manages a RAID group, configured using the storage spaces of the plurality of memory devices, in units of chunks,
wherein the storage controller provides a virtual volume configured of a plurality of virtual chunks to a host computer, maps one or more of the chunks to one or more of the virtual chunks upon receiving a write request to the one or more virtual chunks from the host computer, and stores write data to the mapped chunks,
wherein the storage controller stores a first policy set for the RAID group,
wherein upon determining that a part of the storage area of a particular nonvolatile storage medium is in an unusable state, the device controller notifies the storage controller of a size of the storage area in the unusable state,
wherein the storage controller determines a reduction amount of the logical capacity of a particular memory device having the part of the storage area of the nonvolatile storage medium in the unusable state based on the policy, computes a new logical capacity after reduction of the logical capacity of the particular memory device, changes a capacity of the RAID group by multiplying the logical capacity of the memory device having a minimum value of the logical capacities of the plurality of memory devices included in the RAID group by a number of the plurality of memory devices included in the RAID group, and
wherein the storage controller changes the capacity of the RAID group after migrating data in the chunks mapped to the virtual chunks subject to reduction to a different RAID group.

6. The storage device according to claim 1,
wherein the policy is set by a user.

7. The storage device according to claim 5,
wherein the storage controller notifies the reduction amount of the logical capacity and the reserve capacity being determined to the particular memory device, and
the device controller, corresponding to the particular nonvolatile storage medium, reduces the logical capacity and the reserve capacity based on the reduction amount of the logical capacity and the reserve capacity received from the storage controller.

8. The storage device according to claim 5,
wherein the policy is set to maintain performance, and
the storage controller determines to reduce the logical capacity without reducing the reserve capacity.

9. The storage device according to claim 5,
wherein the policy is set to maintain a Write Amplification Factor (WAF),
the storage controller determines a reduction amount of the logical capacity and the reserve capacity such that a ratio of logical capacity and reserve capacity does not vary before reduction and after reduction of the logical capacity and the reserve capacity of the memory device.

10. The storage device according to claim 5,
wherein the policy is set by a user.

* * * * *